(12) United States Patent
Kristjansson et al.

(10) Patent No.: US 11,101,680 B2
(45) Date of Patent: Aug. 24, 2021

(54) PARALLEL BATTERY CHARGE MANAGEMENT

(71) Applicant: Microsoft Technology Licensing, LLC, Redmond, WA (US)

(72) Inventors: Stefan Jon Kristjansson, Kirkland, WA (US); Yen Ying Lee, Kirkland, WA (US); Gene R. Obie, Coupeville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/456,943

(22) Filed: Jun. 28, 2019

(65) Prior Publication Data

US 2020/0412132 A1    Dec. 31, 2020

(51) Int. Cl.
*H02J 7/00* (2006.01)
(52) U.S. Cl.
CPC ............ *H02J 7/008* (2013.01); *H02J 7/0014* (2013.01); *H02J 7/0021* (2013.01)
(58) Field of Classification Search
CPC ....................................... H02J 7/008
USPC ........................................ 320/103
See application file for complete search history.

(56) References Cited

U.S. PATENT DOCUMENTS

| | | | |
|---|---|---|---|
| 3,956,638 A | 5/1976 | Ahrens et al. | |
| 5,486,749 A | 1/1996 | Brainard | |
| 6,037,750 A | 3/2000 | Von | |
| 6,049,141 A | 4/2000 | Sieminski et al. | |
| 6,163,086 A | 12/2000 | Choo | |
| 6,208,039 B1 | 3/2001 | Mendelsohn et al. | |
| 6,462,511 B1 | 10/2002 | Kwok | |
| 6,586,909 B1 | 7/2003 | Trepka | |
| 7,064,521 B2 | 6/2006 | Stanesti et al. | |
| 7,136,701 B2 | 11/2006 | Greatbatch et al. | |
| 7,330,014 B2 | 2/2008 | Obayashi | |
| 7,414,381 B2 | 8/2008 | Popescu-Stanesti et al. | |

(Continued)

FOREIGN PATENT DOCUMENTS

KR    101808449 B1    12/2017

OTHER PUBLICATIONS

"How to Charge Lead Acid Marine and RV Batteries In Parallel", Retrieved From: https://web.archive.org/web/20170316213447/http://www.impactbattery.com/blog/tutorials/how-to-charge-marine-and-rv-batteries-in-parallel/, Mar. 16, 2017, 4 Pages.

(Continued)

*Primary Examiner* — Yalkew Fantu
(74) *Attorney, Agent, or Firm* — Holzer Patel Drennan

(57) ABSTRACT

An electronic device adjusts power supplied to a first battery power source by a second battery power source. A battery current sense circuit senses a charge current supplied to the first battery power source. Operation of a tracking circuit depends on the charge current. A charge feedback controller generates a control voltage based on an output voltage at a first battery port of the first battery power source. A voltage converter circuit includes an input port electrically coupled to the second battery power source and an output port electrically coupled to the tracking circuit and the first battery power source. The voltage converter circuit adjusts the charge current supplied by the second battery power source through the voltage converter circuit to the first power source based on the control voltage.

20 Claims, 14 Drawing Sheets

(56) References Cited

U.S. PATENT DOCUMENTS

| | | | |
|---|---|---|---|
| 7,518,338 | B2 | 4/2009 | Wang et al. |
| 7,812,579 | B2 | 10/2010 | Williams |
| 7,872,443 | B2 | 1/2011 | Ward |
| 8,120,312 | B2 | 2/2012 | Bucur et al. |
| 8,659,182 | B2 | 2/2014 | Ichikawa et al. |
| 8,674,658 | B2 | 3/2014 | Wang et al. |
| 8,860,372 | B2 | 10/2014 | Guang et al. |
| 9,007,033 | B2 | 4/2015 | Li |
| 9,013,163 | B2 | 4/2015 | Faerber |
| 9,197,076 | B2 | 11/2015 | Butzmann |
| 9,246,348 | B2 | 1/2016 | Solie |
| 9,491,314 | B2 | 11/2016 | Wimpenny |
| 9,678,163 | B2 | 6/2017 | McCoy et al. |
| 9,694,697 | B2 | 7/2017 | Brabec |
| 10,056,767 | B2 | 8/2018 | Troberg et al. |
| 10,250,059 | B2 | 4/2019 | Aldehayyat et al. |
| 10,523,042 | B2 | 12/2019 | Song et al. |
| 2005/0212489 | A1 | 9/2005 | Denning et al. |
| 2006/0066286 | A1 | 3/2006 | Yokota et al. |
| 2007/0247107 | A1 | 10/2007 | Wang et al. |
| 2008/0238356 | A1 | 10/2008 | Batson et al. |
| 2011/0025124 | A1 | 2/2011 | Brabec |
| 2012/0038320 | A1 | 2/2012 | Kabasawa et al. |
| 2012/0105001 | A1* | 5/2012 | Gallegos ............... H02J 7/0027 320/109 |
| 2013/0335028 | A1 | 12/2013 | Choi |
| 2014/0203780 | A1 | 7/2014 | Hu et al. |
| 2014/0306666 | A1* | 10/2014 | Choi ..................... H02J 7/0016 320/134 |
| 2014/0312844 | A1* | 10/2014 | Mercier .................. B60L 58/19 320/118 |
| 2015/0180243 | A1* | 6/2015 | Park ....................... H02J 7/008 320/107 |
| 2015/0207339 | A1 | 7/2015 | Hamburgen et al. |
| 2016/0033982 | A1* | 2/2016 | Moon .................. H02M 3/156 323/281 |
| 2016/0111908 | A1 | 4/2016 | Kwark et al. |
| 2016/0241048 | A1 | 8/2016 | Badam et al. |
| 2017/0054303 | A1 | 2/2017 | Choi et al. |
| 2017/0063123 | A1 | 3/2017 | Horie |
| 2017/0242465 | A1 | 8/2017 | Kelly et al. |
| 2017/0324256 | A1 | 11/2017 | Mcmorrow et al. |
| 2019/0081487 | A1 | 3/2019 | Baby et al. |
| 2019/0214831 | A1 | 7/2019 | Kristjansson et al. |
| 2019/0214837 | A1 | 7/2019 | Kristjansson |
| 2020/0412136 | A1 | 12/2020 | Kristjansson et al. |

OTHER PUBLICATIONS

"How-To: Parallel Charging", Retreived From: https://web.archive.org/web/20120108063234/http:/www.tjinguytech.com/charging-how-tos/parallel-charging, Jan. 8, 2012, 9 Pages.

"Properly Configure Parallel Power Supplies to Share Load Current or Risk System Failure", Retrieved from: https://www.digikey.com/en/articles/techzone/2016/sep/properly-configure-parallel-power-supplies, Sep. 28, 2016, 6 Pages.

"Non Final Office Action Issued in U.S. Appl. No. 15/867,028", dated May 16, 2019, 12 Pages.

"International Search Report and Written Opinion Issued in PCT Application No. PCT/US2018/066341", dated Mar. 11, 2019, 11 Pages.

"Non Final Office Action Issued in U.S. Appl. No. 15/867,028", dated Mar. 12, 2020, 14 Pages.

"Final Office Action Issued in U.S. Appl. No. 15/867,028", dated Oct. 4, 2019, 13 Pages.

"International Search Report and Written Opinion Issued in PCT Application No. PCT/US2020/031962", dated Jul. 13, 2020, 15 Pages.

"International Search Report and Written Opinion Issued in PCT Application No. PCT/US20/031961", dated Jul. 3, 2020, 13 Pages.

"Non Final Office Action Issued in U.S. Appl. No. 16/457,035", dated Dec. 16, 2020, 12 Pages.

"Final Office Action Issued in U.S. Appl. No. 16/457,035", dated Mar. 30, 2021, 9 Pages.

"Notice of Allowance issued in U.S. Appl. No. 16/457,035" dated Jun. 14, 2021, 11 Pages.

\* cited by examiner

PARALLEL BATTERY CHARGE MANAGEMENT

The present application is related to U.S. Nonprovisional patent application Ser. No. 16/457,035, entitled "Parallel Battery Discharge Management" and filed concurrently herewith, which is specifically incorporated herein by reference for all that it discloses and teaches.

BACKGROUND

Modern computing devices often rely on rechargeable battery power sources to provide mobile computing functionality. Some mobile computing devices, such as laptop computers, also support various physical configurations (e.g., a foldable computing device with two or more device sections, a computing device with detachable device sections). Such physical designs present opportunities and challenges for battery pack placement, charging ports and circuitry, protection circuitry, charging/discharging operation, and other design factors.

SUMMARY

The described technology provides an electronic device for adjusting power supplied to a first battery power source by a second battery power source. The first battery power source includes a first battery port. A battery current sense circuit is electrically coupled to sense a charge current supplied to the first battery power source. A tracking circuit is electrically coupled to the first battery port of the first battery power source. Operation of the tracking circuit is dependent on the sensed charge current. A charge feedback controller is electrically coupled to the battery current sense circuit and the tracking circuit and is configured to generate a control voltage based on an output voltage at the first battery port of the first battery power source. A voltage converter circuit includes an input port electrically coupled to the second battery power source and an output port electrically coupled to the tracking circuit and the first battery power source. The voltage converter circuit is configured to adjust the charge current supplied by the second battery power source through the voltage converter circuit to the first power source based on the control voltage.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
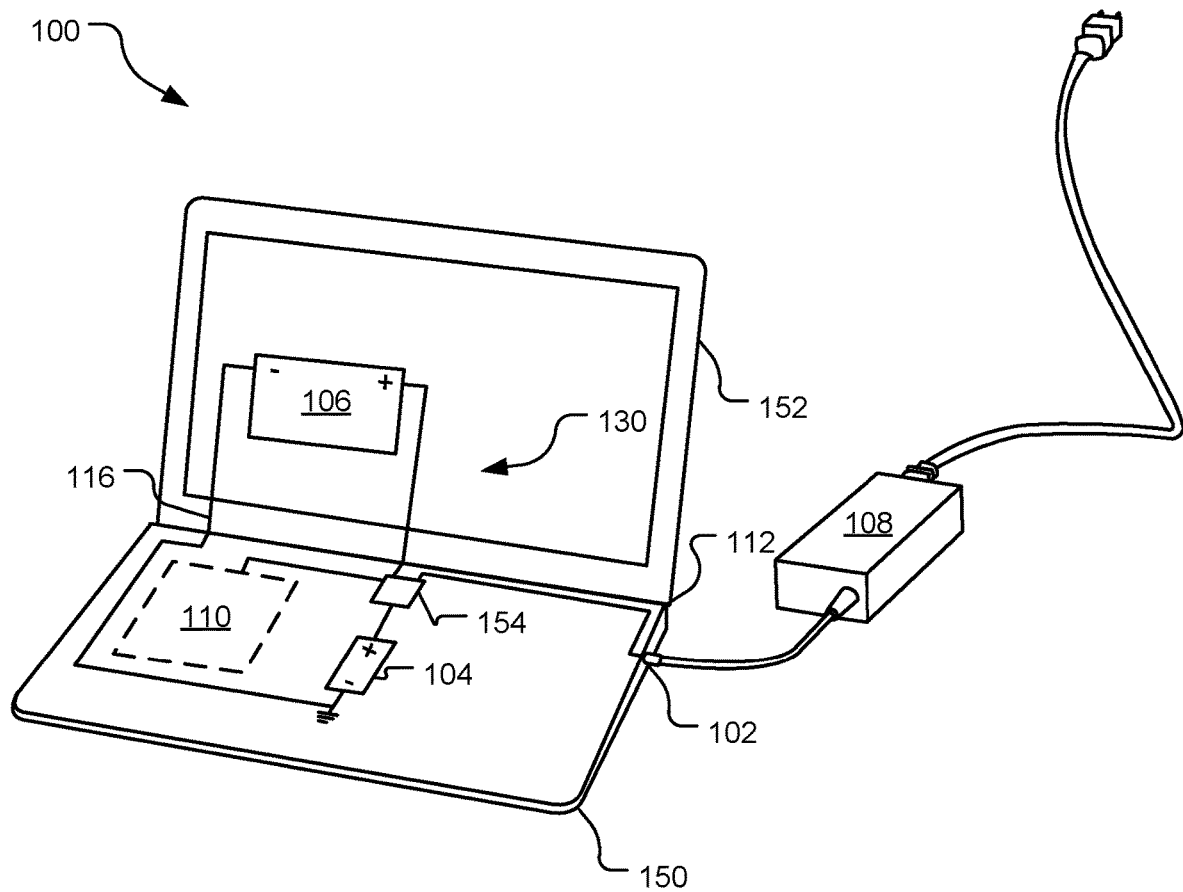
FIG. 1 illustrates an example electronic device having two device sections, each with its own battery power source.

In a computing device that includes multiple device sections (e.g., a keyboard section and a display section, two display sections, or a main device section and a detachable battery pack or case), a rechargeable battery power source (e.g., a battery pack) can be placed in more than one device section. Not only does this approach provide valuable space for additional/larger batteries, but it can also present the option of detaching one device section from another and powering each device section from its own battery power source, in some configurations. Including multiple battery power sources in an electronic computing device is also a way to extend run-time capacity by providing a larger charge capacity than that of a single battery power source. However, multiple battery power sources in a computing device can present protection and charging/discharging issues between the battery power sources.

If battery packs connected in parallel have identical charge characteristics (e.g., voltage level, impedance, total charge capacity, and/or relative charge state at any given point in time), the battery packs may be connected in series (to increase voltage level) or in parallel (to keep same voltage level but increase total charge capacity), allowing the battery packs to charge and discharge at substantially identical rates. If, however, the battery packs have disparate charge characteristics, battery life preservation may depend on regular operation of the batteries at different charge and/or discharge rates. For example, charging a low capacity battery pack at a higher-than-recommended charge rate can result in severe battery degradation (e.g., faster aging and/or reduced cycle life), and charging a high capacity battery pack at a lower-than-recommended charge rate increases charge time and, therefore, may limit performance capability during battery discharge.

To address the above charging challenges, a system can isolate battery packs with disparate charge characteristics during charging. For example, a high capacity battery pack and a low capacity battery packs may be charged sequentially one at a time from a single charger or charged in parallel, isolated, and with separate chargers. However, sequentially charging battery packs is time-consuming, and there exists a risk that a sudden power loss may leave different battery packs with different states of charge, causing one battery pack to back-charge into another at an unsafe rate, if not isolated. In contrast to sequential charging, parallel charging with different chargers can be costly to implement and may lead to complications in balancing charge when the battery packs are reconnected after charging.

In addition to the above-described charging challenges in designing parallel battery pack circuits, battery packs with disparate charge characteristics may naturally discharge at different rates, leading to unequal states of charge. If two electrically-coupled battery packs have unequal states of charge at any time (e.g., 20% charged and 70% charged, for example), the battery pack with the higher state of charge may try to discharge into the other battery pack in an uncontrolled manner. If this discharge is too high due to battery voltage differences and different internal resistance between the battery packs, current protection may be tripped and/or the life of the battery pack receiving the discharge may be degraded. Furthermore, discharging (and charging) a first battery pack more frequently than a second battery pack can cause disparate wear-and-tear on the second battery pack over time, such that the first battery pack will fail much early in its useful lifetime than the second battery pack.

In addition, a flexible and/or detachable boundary ("a device section boundary") between device sections of the computing device can be traversed by an electrical connector (with or without a high impedance) into the battery circuit. Furthermore, such a connector may experience enhanced mechanical wear and tear on the cabling and/or connectors between the device sections. It should be understood that a mobile computing device and a battery charging case may constitute examples of separate device sections separated by a device section boundary.

As used herein, two battery packs are referred to as "disparate" or "having disparate charge characteristics" when characterized by charge profiles that are substantially non-identical, such as when the battery packs have different charge capacities, voltage levels, and/or physical characteristics that may lead to different relative states of charge when simultaneously integrated within a same electronic device. For example, two battery packs have disparate charge characteristics if they have different charge capacities, are at different states of charge, supply different voltage levels, and/or are physically located in proximity to system loads (and thus impedance) in such a way as to discharge at different rates (thereby leading to different states of charge).

FIG. 1 illustrates an example electronic device 100 having two device sections 150 and 152, each with its own battery power source (e.g., a first battery pack 104 and a second battery pack 106). The example electronic device 100 includes a distributed battery architecture that supports parallel charging and/or discharging of battery packs with disparate charge characteristics by virtue of a parallel battery discharge/charge management circuitry 154. The electronic device 100 is shown to be a foldable mobile computing device in FIG. 1 but may, in other implementations, be any battery-powered electronic device. Moreover, in at least one implementation, the two device sections 150 and 152 are detachable from each other.

The electronic device 100 includes system electronics 110 (e.g., a processor, memory, display, speakers, wireless circuitry), representing a system load and being supported by current from a battery circuit 130, which includes the two disparate battery packs (the first battery pack 104 and a second battery pack 106) electrically arranged in parallel. Both device sections 150 and 152 may include their own system loads.

In one implementation, the first battery pack 104 is in the form of a battery pack including one battery cell (referred to as the "1S" battery or battery pack), and the second battery pack 106 is in the form of a battery pack including two battery cells connected in series (referred to as the "2S" battery or battery pack). The two battery packs are rechargeable through the parallel battery discharge/charge management circuitry 154 and a single charging node 102 when connected to an external power source, such as to a charger 108 plugged into an outlet or other power supply. In at least one implementation disclosed herein, the first battery pack 104 and the second battery pack 106 are also rechargeable in the sense they may "rebalance" without a charger attached, if the system loads are light. Also, in at least one implementation disclosed herein, the first battery pack 104 and the second battery pack 106 are also dischargeable in the sense that their relative discharge rates to one or more system loads can be balanced between the two battery packs.

In different implementations, the first battery pack 104 and the second battery pack 106 may vary in relative charge profiles, positions, and connections within the electronic device 100. In one example implementation, the first battery pack 104 and the second battery pack 106 are of different charge capacities and/or different voltage levels (e.g., a single-cell battery pack (1S) including a single 3-4.4V battery cell and a dual-cell (2S) battery pack including two 3-4.4V battery cells in series). Other combinations of battery packs having different types of disparate charge profiles may be employed.

The battery power sources in the device sections 150 and 152 are separate battery packs with independent fuel gauges and protection circuitry. In FIG. 1, the first battery pack 104 (e.g., a 1S battery pack) has a smaller charge capacity and voltage level than the second battery pack 106 (e.g., a 2S battery pack). Additionally, the first battery pack 104 and the second battery pack 106 are located in different device sections 150 and 152 of the electronic device 100, and these sections are designed to fold relative to one another relative to a central hinged portion 112. It should be understood that, in some implementations, the device sections 150 and 152 are detachable from each other (e.g., at or near the hinge). In other implementations described herein, the different battery packs can be located in the same device section, and the electronic device 100 need not be foldable or detachable and need not include a hinge or multiple device sections, as these features are described as example implementations.

Hinge wiring 116 extends through the central hinged portion 112 to couple the first battery pack 104 to the second battery pack 106. In a configuration with detachable device sections, the hinge wiring 116 includes a detachable interconnect (not shown) to allow the hinge wiring 116 to separate into different wiring sections when the device sections 150 and 152 are detached and to connect when the device sections 150 and 152 are attached. The hinge wiring 116 acts as an additive source impedance contributing to total electrical loss (e.g., voltage drop and power loss under load) between the first battery pack 104 and the second battery pack 106. If the second battery pack 106 alone was relied on to support the system electronics 110, electrical loss due to the source impedance may be—at times—high enough to risk system brown-out under especially high load transients or result in degraded system performance. In the illustrated design, however, the first battery pack 104 and the second battery pack 106 combine to share the load of the system electronics 110, reducing the likelihood of a brown-out by reducing the total source impedance to the system load. In one implementation, the second battery pack 106 is electrically coupled through the hinge wiring 116 to a voltage converter circuit in the parallel battery discharge/ charge management circuitry 154 of the device section 150. The output of the voltage converter circuit is influenced by a control voltage that depends on the current supplied by the first battery pack 104. The control voltage causes the voltage converter to balance the current supplied the system electronics 110 between the first battery pack 104 and the second battery pack 106. In one implementation, by balancing the two battery-pack-supplied currents, the electronic device 100 receives one or more of enhanced run-time capacity, extended battery pack lifetimes, and reduced brown-out risk.

Although not shown in FIG. 1, the battery circuit 130 may include circuitry to selectively balance discharge from each of the first battery pack 104 and the second battery pack 106 according to their respective battery charge characteristics (e.g., the current to and from one of the batteries). Alternatively, or additionally, the battery circuit 130 may include circuitry to supply charge from the second battery pack 106 to the first battery pack 104, while maintaining the charge current below the charge current limit of the first battery pack 104. Some example circuitry serving these purposes is discussed with respect to subsequent figures.

Figure 2:
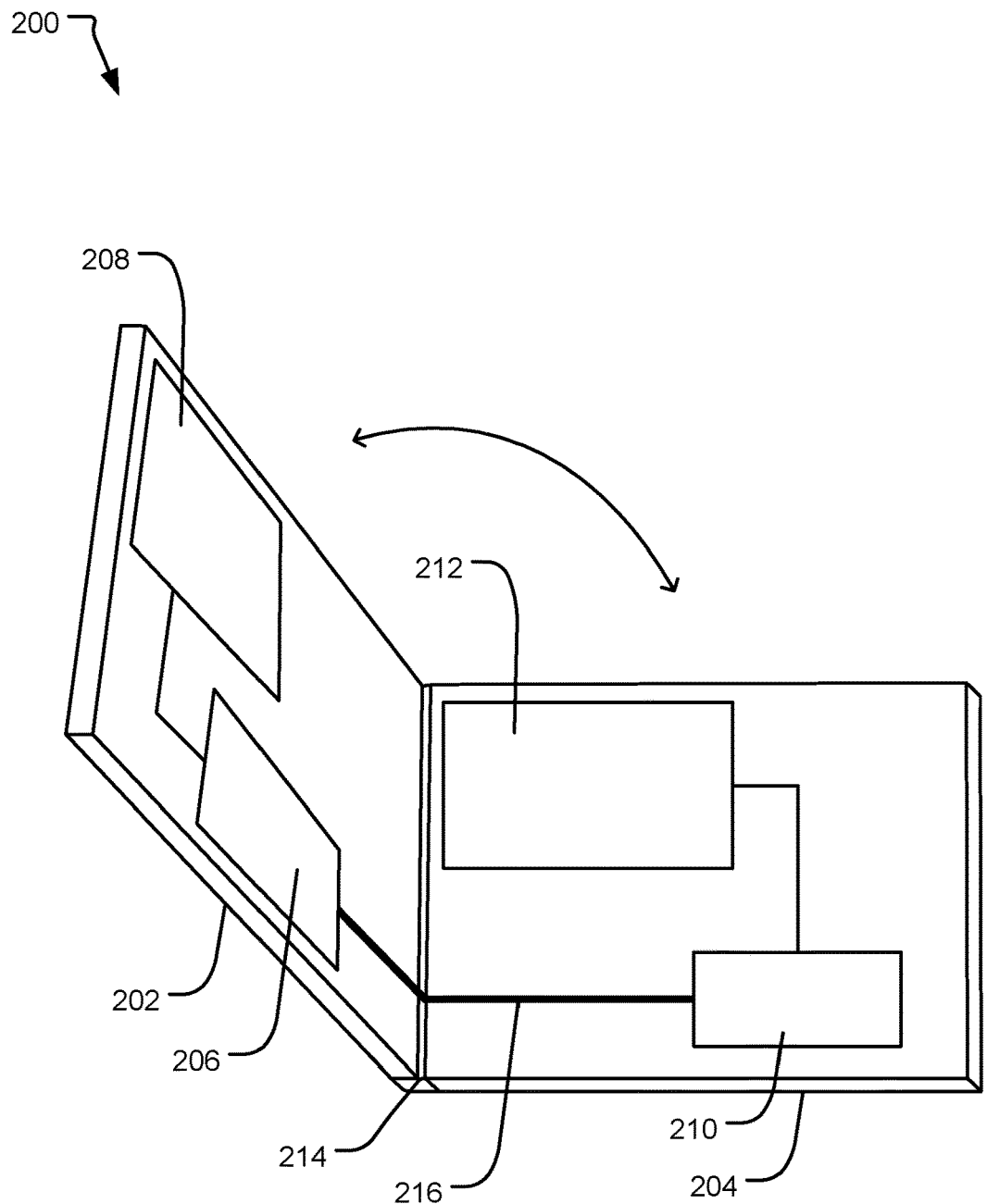
FIG. 2 illustrates an example computing device having two foldable device sections, each with its own battery power source.

FIG. 2 illustrates an example computing device 200 having a first device section 202 and a second device section 204. The first device section 202 includes a first battery power source 206 connected to a first system load 208. The second device section 204 includes a second battery power source 210 connected to a second system load 212. The first battery power source 206 and the second battery power source 210 are connected across a folding hinged boundary 214 via an electrical connector 216 (which may or may not include a high impedance connector) and by a parallel battery discharge/charge management circuitry (not shown). The first device section 202 and the second device section 204 fold relative to each other about the folding hinged boundary 214. It should be understood that other movable boundaries between device sections may be employed, including a boundary in which the device sections slide with respect to one another (whether they maintain an electrical connection or not).

In one implementation, each battery power source is in the form of a battery pack with its own gas gauge and protection circuitry, although other implementations may omit one or both of these components. A battery gas gauge (or fuel gauge) measures the level of remaining capacity in a battery under operating conditions. Battery protection circuitry detects a variety of fault conditions, such as overvoltage, under-voltage, discharge overcurrent, and short-circuiting.

In one implementation, both the first device section 202 and the second device section 204 include their own systems loads, although other implementations may not include system loads for both device sections. In FIG. 2, each battery power source provides power to the system load in its device section, in addition to actively providing power in a shared fashion to the system load in the other device section through the parallel battery discharge/charge management circuitry (not shown) using one or more implementations described herein.

One or both of the first device section 202 and the second device section 204 can include one or more charge management circuits and/or one or more discharge management circuits (individually or collectively referred to as the "the parallel battery discharge/charge management circuitry"). In at least one implementation, such a charge management circuitry balances charge supplied through a charge port to both the first battery power source 206 and the second battery power source 210. In at least one implementation, such a discharge management circuitry balances charge supplied to at least one of the system loads 208 and 212 from both the first battery power source 206 and the second battery power source 210.

Figure 3:
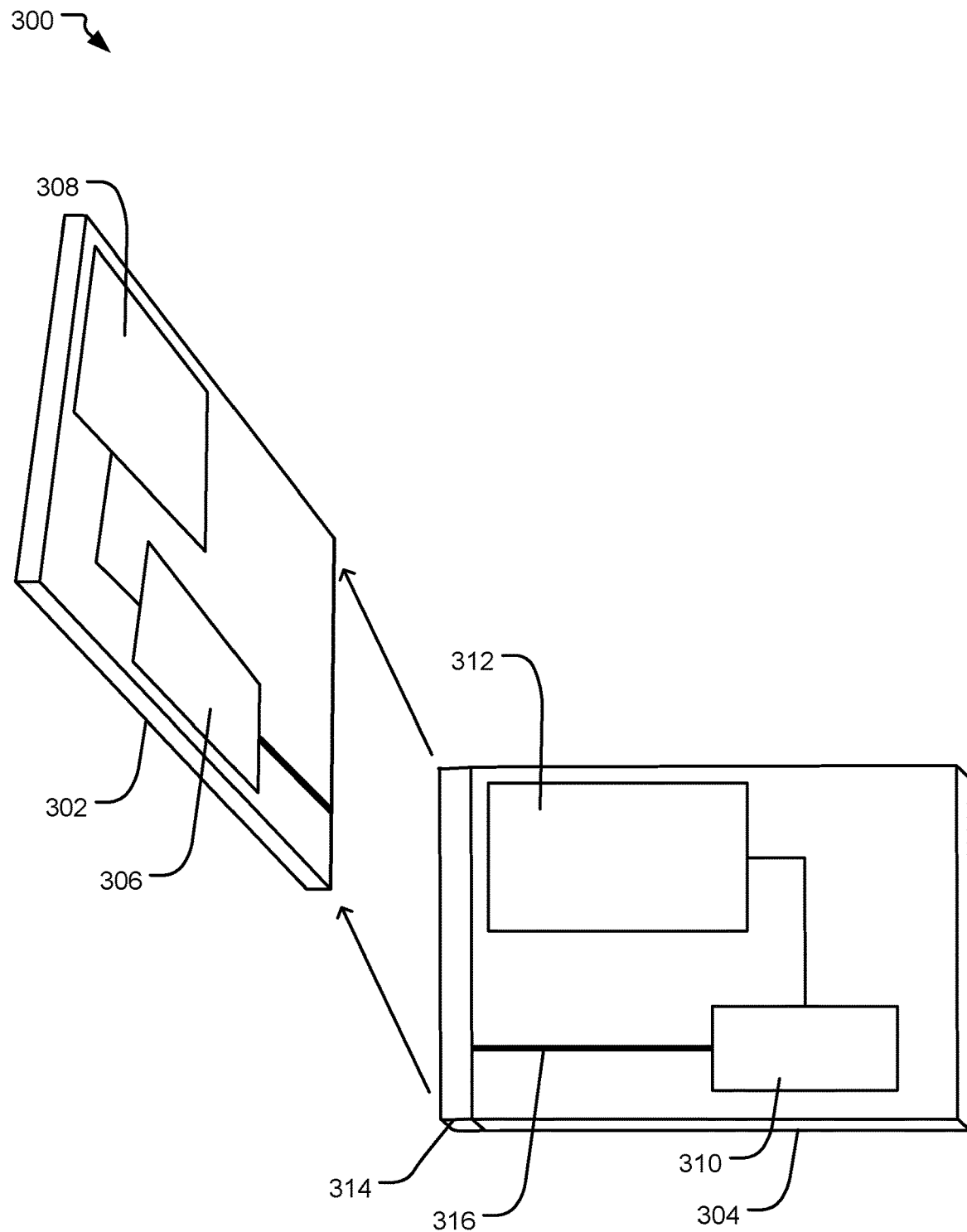
FIG. 3 illustrates an example computing device having two detachable device sections, each with its own battery power source.

FIG. 3 illustrates an example computing device 300 having a first device section 302 and a second device section 304. The first device section 302 includes a first battery power source 306 connected to a first system load 308. The second device section 304 includes a second battery power source 310 connected to a second system load 312. The first battery power source 306 and the second battery power source 310 are connected across a detachable and foldable hinged boundary 314 via an electrical connector 316 (which may or not include a high impedance connector) and a parallel battery discharge/charge management circuitry (not shown). The first device section 302 and the second device section 304 fold relative to each other about the hinged boundary 314, and the first device section 302 and the second device section 304 can also be attached to and detached from each other at the folding hinged boundary 314. In one implementation, each battery power source is in the form of a battery pack with its own gas gauge and protection circuitry, although other implementations may omit one or both of these components.

In one implementation, both the first device section 302 and the second device section 304 include their own systems loads, although other implementations may not include system loads for both device sections. In FIG. 3, each battery power source provides power to the system load in its device section, in addition to actively providing power in a shared fashion to the system load in the other device section through the parallel battery discharge/charge management circuitry (not shown) using one or more implementations described herein.

One or both of the first device section 302 and the second device section 304 includes one or more charge management circuitry and/or one or more discharge management circuitry (individually or collectively referred to as the "the parallel battery discharge/charge management circuitry"). In at least one implementation, such a charge management circuitry balances charge supplied through a charge port to both the first battery power source 306 and the second battery power source 310. In at least one implementation, such a discharge management circuitry balances charge supplied to at least one of the system loads 308 and 312 from both the first battery power source 306 and the second battery power source 310. In one implementation, when the device sections are detached, each device section is powered by its own battery pack. Another example computing device having multiple device sections may include a mobile phone or tablet (as a first device section) combined with an external battery case (as a second device section).

Figure 4:
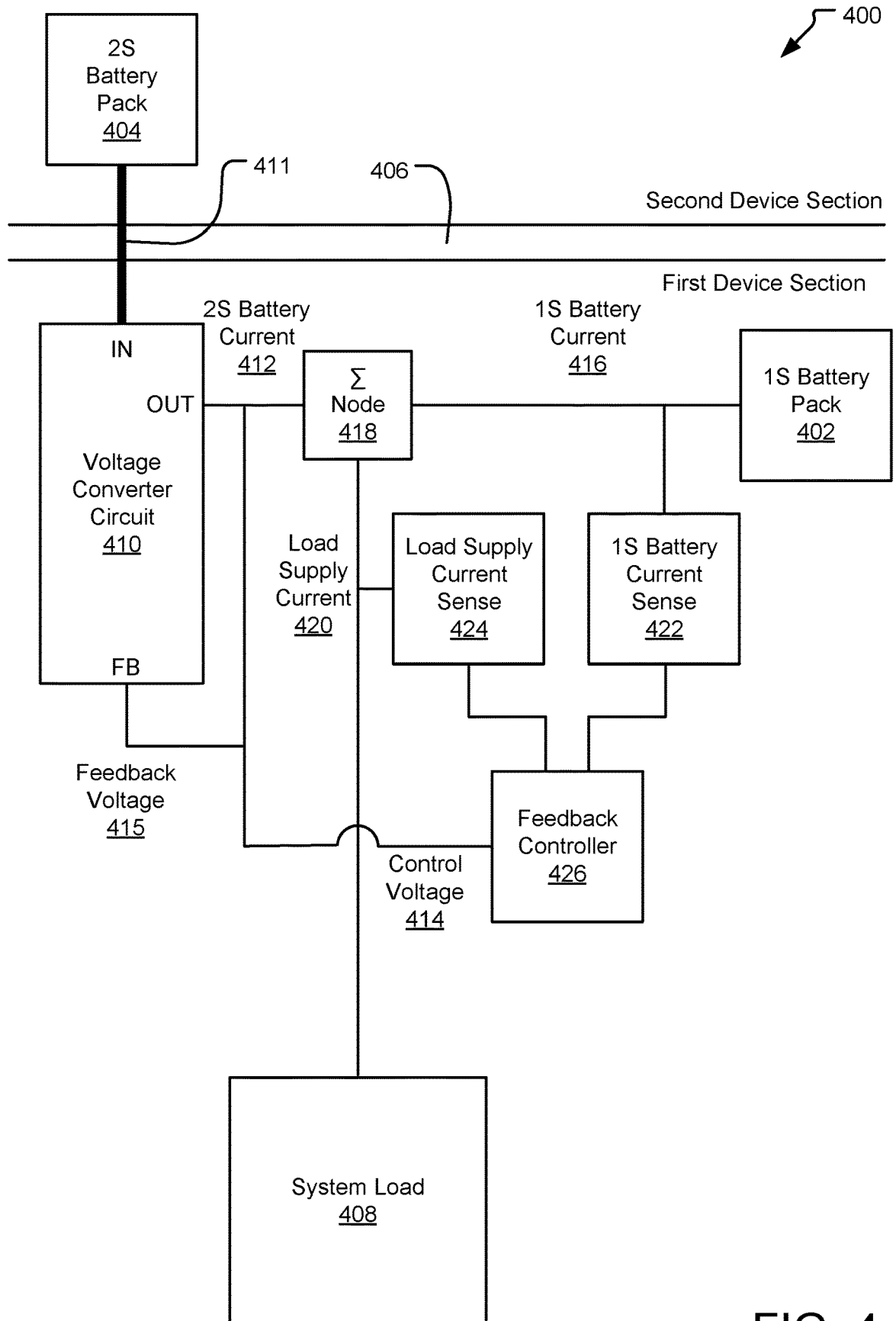
FIG. 4 illustrates example parallel battery discharge management circuitry.

FIG. 4 illustrates example parallel battery discharge management circuitry 400. In the illustrated implementation, a 1S battery pack 402 is located in a first device section of a multi-section computing device and supplies a variable 1S battery current 416 with a single battery cell having a nominal cell voltage of 3.6V, an end-of-discharge voltage of 2.8-3.0V and a maximum charge voltage of 4.4V. A 2S battery pack 404 is located in a second device section of the multi-section computing device and supplies a variable 2S battery current 412 with a two battery cell connected in series (e.g., each battery cell having a nominal cell voltage of 3.6V, an end-of-discharge voltage of 2.8-3.0V and a maximum charge voltage of 4.4V). Battery cells providing different charge voltages may alternatively be employed. Accordingly, the voltage level of the 2S battery pack 404 is higher than the voltage level of the 1S battery pack 402, and therefore the 2S battery pack 404 is "stepped-down" (e.g., by a voltage converter circuit 410) to contribute to the power supplied to the system load.

It should be understood that other types of battery cells, nominal voltages, and charge capacities may be employed. Example battery technologies employed in various implementations may include without limitation lithium-ion battery cells, cobalt-based Li-ion battery cells, lithium polymer battery cells, and ceramic battery cells, and different battery packs in the same electronic device may employ different battery technologies. It should also be understood that the 1S battery pack 402 and the 2S battery pack 404 present disparate voltages and charge capacities (e.g., the two series battery cells of the 2S battery pack 404 present approximately twice the voltage level of the single battery cell of the 1S battery pack 402). Other disparate battery pack pairings may also be used (e.g., 3S and 1S, 3S and 2S, 4S and 1S). Such disparate battery pack pairings can be used in any implementation disclosed herein. Furthermore, the disparate battery packs can be at relatively different states of charge (and thus voltage) at any given time.

The 1S battery current 416 and 2S battery current 412 can both contribute to a load supply current 420 supplied to a system load 408. The parallel battery discharge management circuitry 400 represents an example circuit for providing active load sharing by parallel disparate battery packs to the system load 408.

The two device sections are divided by a device section boundary 406, which may include a foldable and/or detachable interconnection or hinge. The first device section includes the system load 408, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying discharge management circuitry are configured to supply power (associated with the load supply current 420) to the system load 408. The parallel battery discharge management circuitry 400 shown in FIG. 4 includes the voltage converter circuit 410 (e.g., a buck converter) with an input port that is electrically coupled to the 2S battery pack 404 via an electrical connector 411. In one implementation, the electrical connector 411 includes a high impedance connector that bridges the device section boundary 406 and presents a voltage drop between the 2S battery pack 404 and the voltage converter circuit 410 equal to or greater than 5% of the concurrent voltage supplied to the system load 408. In another implementation, the electrical connector 411 includes a high impedance connector that bridges the device section boundary 406 and presents an interconnect impedance that is equal to or greater than 20% of the impedance of the 2S battery pack 404. In other implementations, the electrical connector 411 need not include a high impedance connector.

The voltage converter circuit 410 also includes an output port from which the 2S battery current 412 supplied by the 2S battery pack 404 is provided to a summing node 418. The 1S battery current 416 contribution and the 2S battery current 412 contribution combine at the summing node 418 to yield the load supply current 420 provided to the system load 408. It should be understood that the discharge current contribution provided by either the 1S battery pack 402 or the 2S battery pack 404 can be zero amps in some operating conditions.

The voltage converter circuit 410 also includes a feedback voltage input port to which a feedback voltage signal 415 is supplied. In one implementation, the feedback voltage signal 415 configures the setpoint of the voltage converter circuit 410.

In the implementation illustrated in FIG. 4, when the control voltage 414 increases, the voltage converter circuit 410 decreases its output current (the 2S battery current 412) contribution to the system load 408, and the 1S battery current 416 contribution increases. When the control voltage 414 decreases, the voltage converter circuit 410 increases its output current (the 2S battery current 412) contribution to the system load 408, and the 1S battery current 416 contribution decreases. In a discharge mode, the control voltage 414 is input to a voltage divider that is configured to maintain the voltage at the output port of the voltage converter circuit 410 below the output voltage of the 1S battery pack 402.

In FIG. 4, the control voltage 414 is based on the 1S battery current 416 and the load supply current 420. A 1S battery current sense circuit 422 measures the 1S battery current 416 and yields a representative voltage signal that is input to a feedback controller 426 (e.g., a discharge feedback controller), and a load supply current sense circuit 424 measures the load supply current 420 and yields another representative voltage signal that is also input to the feedback controller 426.

The feedback controller 426 determines whether and by how much the 1S battery current 416 satisfies a load sharing condition and yields the control voltage 414 that adjusts the output voltage of the voltage converter circuit 410, thereby adjusting the relative 1S battery current 416 and 2S battery current 412 contributions. For example, if the load sharing condition is set to allocate 80% or less of the load supply current 420 to the 1S battery pack 402 (potentially subject to a predefined or variable current limit) as compared to the 2S battery pack 404, then, in one implementation, the feedback controller 426 maintains that load sharing condition using the control voltage 414. For example, if the 1S battery current 416 exceeds 80% of the load supply current 420, the control voltage 414 decreases to cause the 2S battery current 412 contribution increase to be at least 20% of the load supply current 420. The operation of the feedback controller 426 may be performed via circuitry or a combination of circuitry and power control software.

It should be understood that, in any implementation described herein, the load sharing condition may also vary, such as in different operating conditions and/or different physical configurations of the computing device. For example, when the system load in one device section requires more power than the system load in the other device section because of the applications executing at a particular time, the feedback controller 426 can adjust the load sharing condition (e.g., from 80% to 50%) to make better use of the active sharing of power from the two battery packs in that operational state. Likewise, if one of the device sections includes a display and the device sections are closed (e.g., folded together to hide the display), then the power needs to the display system load in that device section decrease, so the load sharing condition may be adjusted to allocate the battery power differently under that physical configuration. In yet another example, the load sharing condition may be adjusted as the charge on one battery pack decreases relative to the other battery pack. The load sharing condition may also be set and/or varied according to user and/or administrator preferences.

Figure 5:
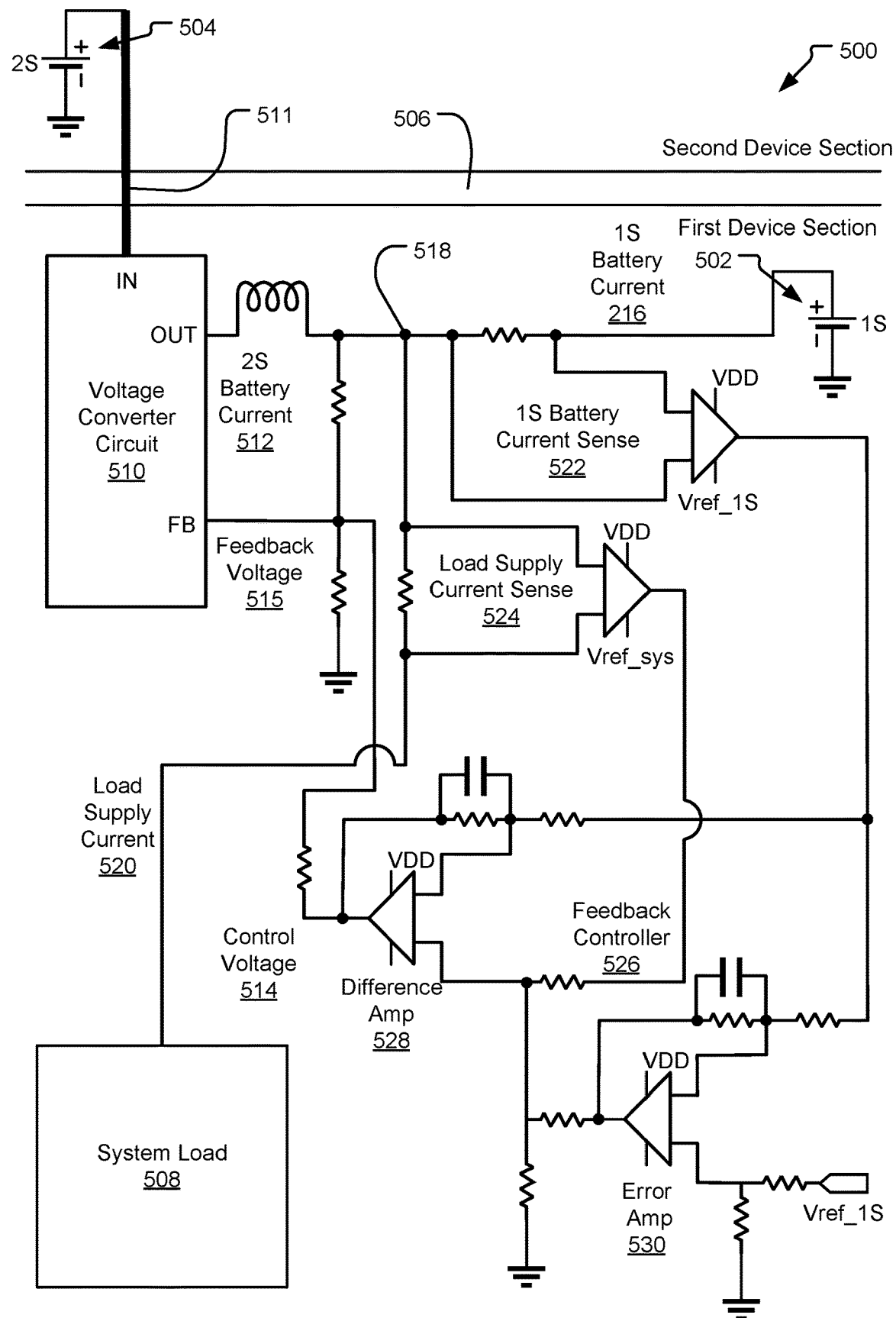
FIG. 5 illustrates a schematic of example parallel battery discharge management circuitry.

FIG. 5 illustrates a schematic of an example parallel battery discharge management circuitry 500. A 1S battery pack 502 is located in a first device section of a multi-section computing device and supplies a variable 1S battery current 516. A 2S battery pack 504 is located in a second device section of the multi-section computing device and supplies a variable 2S battery current 512. The 1S battery current 516 and 2S battery current 512 can both contribute to a load supply current 520 supplied to a system load 508. The parallel battery discharge management circuitry 500 represents an example circuit for providing active load sharing by parallel disparate battery packs to the system load 508.

The two device sections are divided by a device section boundary 506, which may include a foldable and/or detachable interconnection or hinge. The first device section includes the system load 508, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying discharge management circuitry are configured to supply power (associated with the load supply current 520) to the system load 508. The parallel battery discharge management circuitry 500 shown in FIG. 5 includes a voltage converter circuit 510 (e.g., a buck converter) with an input port that is electrically coupled to the 2S battery pack 504 via an electrical connector 511. In one implementation, the electrical connector 511 includes a high impedance connector that bridges the device section boundary 506 and presents a voltage drop between the 2S battery pack 504 and the voltage converter circuit 510 equal to or greater than 5% of the concurrent voltage supplied to the system load 508. In another implementation, the electrical connector 511 includes a high impedance connector that bridges the device section boundary 506 and presents an interconnect impedance that is equal to or greater than 20% of the impedance of the 2S battery pack 504. In other implementations, the electrical connector 511 need not include a high impedance connector.

The voltage converter circuit 510 also includes an output port from which the 2S battery current 512 supplied by the 2S battery pack 504 is provided to a summing node 518. The 1S battery current 516 contribution and the 2S battery current 512 contribution combine at the summing node 518 to yield the load supply current 520 provided to the system load 508. It should be understood that the discharge current contribution provided by either the 1S battery pack 502 or the 2S battery pack 504 can be zero amps in some operating conditions.

The voltage converter circuit 510 also includes a feedback voltage input port to which a feedback voltage signal 515 is supplied. In one implementation, the feedback voltage signal 515 configures the setpoint of the voltage converter circuit 510.

In the implementation illustrated in FIG. 5, when the control voltage 514 increases, the voltage converter circuit 510 decreases its output current (the 2S battery current 512) contribution to the system load 508, and the 1S battery current 516 contribution increases. When the control voltage 514 decreases, the voltage converter circuit 510 increases its output current (the 2S battery current 512) contribution to the system load 508, and the 1S battery current 516 contribution decreases. In some implementations, the current discharge of the 1S battery pack 502 may also be limited to a maximum safe discharge rate so as to prevent overstressing the 1S battery pack 502. In one implementation of a discharge mode, the control voltage 514 is input to a voltage divider that is configured to maintain this output voltage to be less than the output voltage of the 1S battery pack 502, thereby actively balancing the 1S battery current 516 contribution and the 2S battery current 512 contribution to the load supply current 520.

In FIG. 5, the output of the difference amp 528 is based on the 1S battery current 516 and the load supply current 520. A 1S battery current sense circuit 522 measures the 1S battery current 516 through a resistor and yields a representative output voltage signal that is input to a feedback controller 526 (e.g., a discharge feedback controller), and a load supply current sense circuit 524 measures the load supply current 520 through a resistor and yields another representative voltage signal that is also input to the feedback controller 526.

The feedback controller 526 in the illustrated implementation includes an error amplifier 530 and a difference amplifier 528. In accordance with some embodiments, the error amplifier 530 is configured to determine whether the 1S battery pack 502 is at risk of being cross-charged by the 2S battery pack 504 through the voltage converter circuit 510. In some embodiments, the error amplifier 530 detects a reverse current from the summing node 518 into the 1S battery current 516. The reverse current can be detected via the representative output voltage signal of the 1S battery current sense circuit 522 falling below Vref_1S, which causes the error amp 530 outputs a positive voltage (i.e., greater than 0V) to the different amplifier 528 (e.g., corresponding the system being in a charging correction mode). The difference amplifier 528 detects the difference between the output of the error amplifier 530 and the voltage signal representative of 1S battery current 516. The output of the difference amplifier 528 is supplied as a control voltage 514 through a resistor network to yield the feedback voltage signal 515 input to the feedback voltage input port of the voltage converter circuit 510. The voltage converter circuit 510 adjusts the 2S battery current 512 output by the voltage converter circuit 510 (e.g., lowers the output voltage) so as to prevent current from the voltage converter circuit 510 from flowing into the 1S battery pack 502 between the 1S battery pack 502 and the 2S battery pack 504.

When there is no reverse current detected at the summing node 518, the output voltage of the error amplifier 530 will stay at 0V because the representative output voltage signal of the 1S battery current sense circuit 522 remains equal to or above Vref_1S. This mode (no reverse current at the summing node 518) is a discharge mode. In the discharge mode, the voltage converter circuit 510 adjusts the 2S battery current 512 based on the control voltage 514, such that there is active load sharing between the 1S battery pack 502 and the 2S battery pack 504.

The feedback controller 526 determines whether and by how much the 1S battery current 516 satisfies a load sharing condition and yields the control voltage 514 that adjusts the output voltage of the voltage converter circuit 510, thereby adjusting the relative 1S battery current 516 and 2S battery current 512 contributions. For example, if the load sharing condition is set to allocate 80% or less of the load supply current 520 to the 1S battery pack 502 (potentially subject to a predefined current limit) as compared to the 2S battery pack 504, then, in one implementation, the feedback controller 526 maintains that load sharing condition using the control voltage 514 supplied to the voltage converter circuit 510 For example, if the 1S battery current 516 exceeds 80% of the load supply current 520, the control voltage 514 decreases to cause the 2S battery current 512 contribution to be at least 20% of the load supply current 520. The operation of the feedback controller 526 may be performed via circuitry or a combination of circuitry and power control software.

Figure 6:
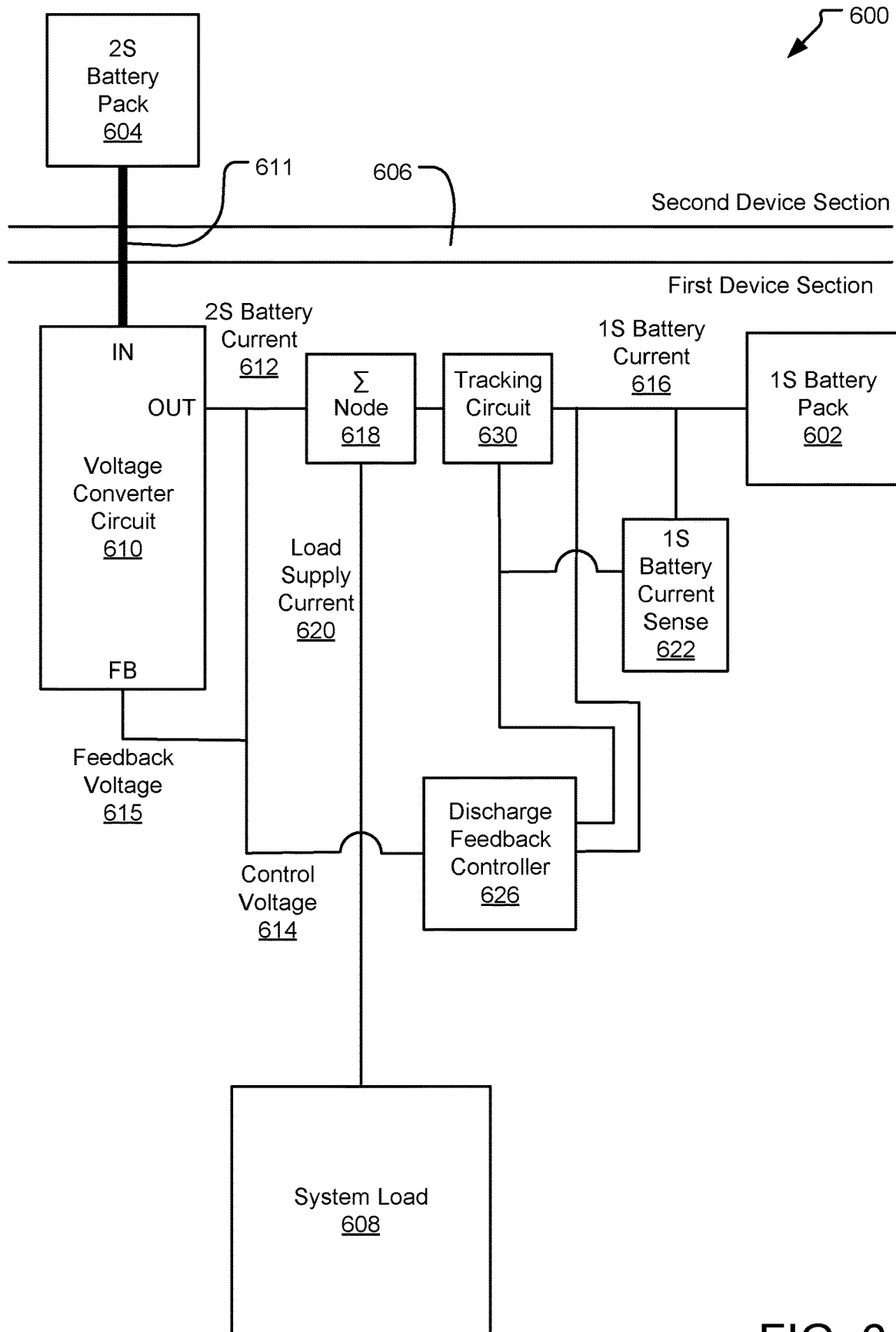
FIG. 6 illustrates example parallel battery discharge management circuitry.

FIG. 6 illustrates an example parallel battery discharge management circuitry 600. A 1S battery pack 602 is located in a first device section of a multi-section computing device and supplies a variable 1S battery current 616 with a single battery cell having a nominal cell voltage of 3.6V, an end-of-discharge voltage of 2.8-3.0V and a maximum charge voltage of 4.4V. A 2S battery pack 604 is located in a second device section of the multi-section computing device and supplies a variable 2S battery current 612 with a two battery cell connected in series (e.g., each battery cell having a nominal cell voltage of 3.6V, an end-of-discharge voltage of 2.8-3.0V and a maximum charge voltage of 4.4V), thus resulting in a combined nominal voltage of 7.2V. Battery cells providing different charge voltages may alternatively be employed.

It should be understood that other types of battery cells, nominal voltages, and charge capacities may be employed. Example battery technologies employed in various implementations may include without limitation lithium-ion battery cells, cobalt-based Li-ion battery cells, lithium polymer battery cells, and ceramic battery cells, and different battery packs in the same electronic device may employ different battery technologies. It should also be understood that the 1S battery pack 602 and the 2S battery pack 604 present disparate voltages and charge capacities (e.g., the two series battery cells of the 2S battery pack 604 present approximately twice the voltage level of the single battery cell of the 1S battery pack 602). Other disparate battery pack pairings may also be used (e.g., 3S and 1S). Such disparate battery pack pairings can be used in any implementation disclosed herein. Furthermore, the disparate battery packs can be at relatively different states of charge (and thus voltage) at any given time.

The 1S battery current 616 and 2S battery current 612 can both contribute to a load supply current 620 supplied to a system load 608. The parallel battery discharge management circuitry 600 represents an example circuit for providing active load sharing by parallel disparate battery packs to the system load 608.

The two device sections are divided by a device section boundary 606, which may include a foldable and/or detachable interconnection or hinge. The first device section includes the system load 608, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying discharge management circuitry are configured to supply power (associated with the load supply current 620) to the system load 608. The parallel battery discharge management circuitry 600 shown in FIG. 6 includes a voltage converter circuit 610 (e.g., a buck converter) with an input port that is electrically coupled to the 2S battery pack 604 via an electrical connector 611. In one implementation, the electrical connector 611 includes a high impedance connector that bridges the device section boundary 606 and presents a voltage drop between the 2S battery pack 604 and the voltage converter circuit 610 equal to or greater than 5% of the concurrent voltage supplied to the system load 608. In another implementation, the electrical connector 611 includes a high impedance connector that bridges the device section boundary 606 and presents an interconnect impedance that is equal to or greater than 20% of the impedance of the 2S battery pack 604. In other implementations, the electrical connector 611 need not include a high impedance connector.

The voltage converter circuit 610 also includes an output port from which the 2S battery current 612 supplied by the 2S battery pack 604 is provided to a summing node 618. The 1S battery current 616 contribution and the 2S battery current 612 contribution combine at the summing node 618 to yield the load supply current 620 provided to the system load 608. It should be understood that the discharge current contribution provided by either the 1S battery pack 602 or the 2S battery pack 604 can be zero amps in some operating conditions.

The voltage converter circuit 610 also includes a feedback voltage input port to which a feedback voltage signal 615 is supplied. In one implementation, the feedback voltage signal 615 configures the setpoint of the voltage converter circuit 610.

In the implementation illustrated in FIG. 6, when the control voltage 614 increases, the voltage converter circuit 610 decreases its output current (the 2S battery current 612) contribution to the system load 608, and the 1S battery current 616 contribution increases. When the control voltage 614 decreases, the voltage converter circuit 610 increases its output current (the 2S battery current 612) contribution to the system load 608, and the 1S battery current 616 contribution decreases. In a discharge mode, the control voltage 614 is set to maintain the voltage at the output port of the voltage converter circuit 610 below the output voltage of the 1S battery pack 602.

In FIG. 6, the control voltage 614 is based on the 1S battery current 616. A 1S battery current sense circuit 622 measures the 1S battery current 616 and yields a representative voltage signal that is input to a discharge feedback controller 626, which is coupled to the voltage converter circuit 610 and a tracking circuit 630 that maintain a relationship between the 1S battery current 616 and 2S battery current 612 contributions supplied to the system load 608. In one implementation, the tracking circuit 630 includes a field-effect transistor (FET) that assists in maintaining the output voltage of the voltage converter circuit 610 at or below the output voltage of the 1S battery pack 602.

When the voltage at the summing node 618 does not satisfy a load sharing condition (e.g., a load sharing condition is set to allow the 1S battery pack 602 to supply 80% or less of the load supply current 620, but the current sense circuits detect that the 1S battery pack 602 is supplying more than 80% of the system load current), the control voltage 614 adjusts the output voltage of the voltage converter circuit 610, thereby adjusting the 2S battery current 612 contribution to the load supply current 620 and satisfying the load sharing condition based (at least in part) on the representative voltage signal for the 1S battery current 616. In one implementation, the voltage converter circuit 610 employs a PSM mode (pulse skip, or light load mode), such that it does not discharge through its low-side FET if its output voltage is slightly biased above its setpoint voltage.

In one implementation, the voltage converter circuit 610 is actively configured to satisfy a load sharing condition. An example load sharing condition may include a determination that the discharge voltage level of the voltage converter circuit 610 tracks at or slightly below the discharge voltage level of the 1S battery pack 602. Another example load sharing condition may include a determination that the discharge current of the 1S battery pack 602 does not exceed a preset discharge current limit. Other load sharing conditions may be applied.

When the 1S battery pack 602 fails to satisfy a load sharing condition, the tracking circuit 630 adjusts a tracking signal supplied to the discharge feedback controller 626. Furthermore, the representative voltage signal for the 1S battery current 616 is also provided as input to the discharge feedback controller 626. An output voltage of the discharge feedback controller 626 provides a control voltage 614 through a resistor network (not shown) as an error signal to the voltage converter circuit 610 to balance additional current provided by the 2S battery pack 604 through the voltage converter circuit 610. Accordingly, the output voltage of the voltage converter circuit 610 is matched to allow the 1S battery pack 602 to discharge in satisfaction of a load sharing condition while additional current supplied to the system load 608 is contributed by the 2S battery pack 604 through the voltage converter circuit 610. This implementation presents an example of actively balancing current provided to the system load 608 by the 1S battery pack 602 and the 2S battery pack 604 (through the voltage converter circuit 610).

The discharge feedback controller 626, therefore, determines whether and by how much the 1S battery current 616 satisfies a load sharing condition and yields the control voltage 614 to adjust the output voltage of the voltage converter circuit 610, thereby adjusting the relative 1S battery current 616 and 2S battery current 612 contributions to re-establish the load sharing condition. The operation of the discharge feedback controller 626 may be performed via circuitry or a combination of circuitry and power control software.

Furthermore, the FET in the tracking circuit 630 may also operate in the linear region to present a variable resistance on the output of the 1S battery pack 602 when constraining discharge current from the 1S battery pack 602 within its discharge current limits. In one implementation, the tracking circuit 630 acts as a constant current limiter in the discharge path of the 1S battery pack 602 by dynamically increasing impedance as the discharge current limit of the 1S battery pack 602 is reached. If the discharge current approaches or exceeds the discharge current limit of the 1S battery pack 602, the representative voltage signal for the 1S battery current 616 begins to turn off the FET and increase the impedance across the FET in the linear region, thereby reducing the 1S battery current 616 supplied to the system load 608. Accordingly, the FET, which can operate in a linear region, presents a variable resistance between the first battery power source and the system load to limit the discharge current supplied by the 1S battery pack 602.

In summary, the parallel battery discharge management circuitry 600 uses the tracking circuit 630 and the discharge feedback controller 626 to configure the output voltage of the voltage converter circuit 610 to track at or below the output voltage of the 1S battery pack voltage so that the 1S battery pack 602 is able to discharge, as desired. Closed loop feedback from a 1S battery current sense circuit 622 in combination with the tracking circuit 630 in the 1S battery pack discharge path is used to dynamically adjust the output of the voltage converter circuit 610 to track its output voltage below the 1S battery pack voltage, such that an acceptable headroom (e.g., a minimum headroom) is maintained. In addition, a FET in the tracking circuit 630 can provide a variable resistance to the output of the 1S battery pack 602 to constrain the 1S battery current 616 within the discharge current limits of the 1S battery pack 602.

Figure 7:
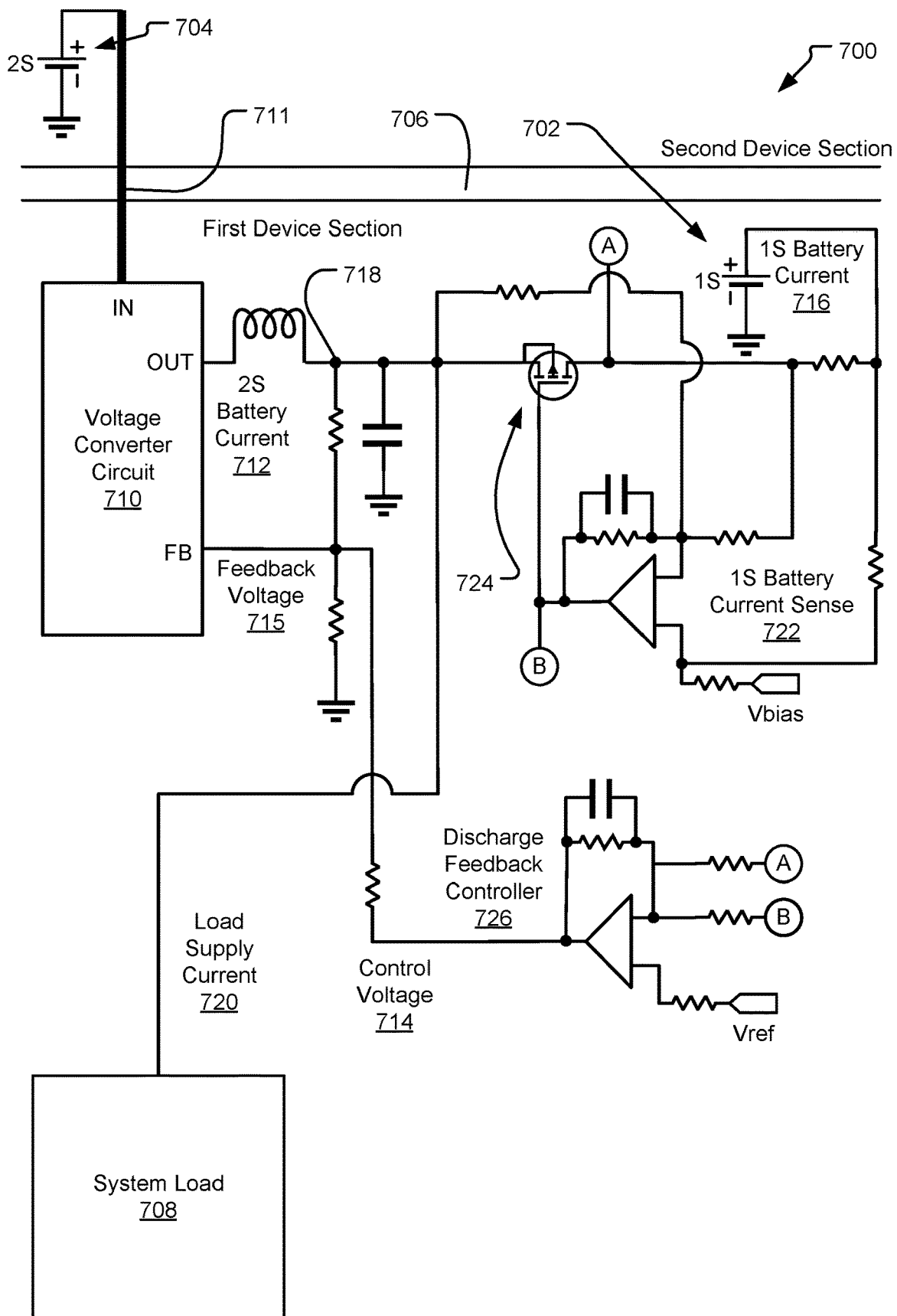
FIG. 7 illustrates a schematic of example parallel battery discharge management circuitry.

FIG. 7 illustrates a schematic of an example parallel battery discharge management circuitry 700. A 1S battery pack 702 is located in a first device section of a multi-section computing device and supplies a variable 1S battery current 716. A 2S battery pack 704 is located in a second device section of the multi-section computing device and supplies a variable 2S battery current 712. The 1S battery current 716 and 2S battery current 712 can both contribute to a load supply current 720 supplied to a system load 708. The parallel battery discharge management circuitry 700 represents an example circuit for providing active load sharing by parallel disparate battery packs to the system load 708.

The two device sections are divided by a device section boundary 706, which may include a foldable and/or detachable interconnection or hinge. The first device section includes the system load 708, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying discharge management circuitry are configured to supply power (associated with the load supply current 720) to the system load 708. The parallel battery discharge management circuitry 700 shown in FIG. 7 includes a voltage converter circuit 710 (e.g., a buck converter) with an input port that is electrically coupled to the 2S battery pack 704 via an electrical connector 711. In one implementation, the electrical connector 711 a high impedance connector that bridges the device section boundary 706 and presents a voltage drop between the 2S battery pack 704 and the voltage converter circuit 710 equal to or greater than 5% of the concurrent voltage supplied to the system load 708. In another implementation, the electrical connector 711 includes a high impedance connector that bridges the device section boundary 706 and presents an interconnect impedance that is equal to or greater than 20% of the impedance of the 2S battery pack 704. In other implementations, the electrical connector 711 need not include a high impedance connector.

The voltage converter circuit 710 also includes an output port from which the 2S battery current 712 supplied by the 2S battery pack 704 is provided to a summing node 718. The 1S battery current 716 contribution and the 2S battery current 712 contribution combine at the summing node 718 to yield the load supply current 720 provided to the system load 708. It should be understood that the discharge current contribution provided by either the 1S battery pack 702 or the 2S battery pack 704 can be zero amps in some operating conditions.

The voltage converter circuit 710 also includes a feedback voltage input port to which a feedback voltage signal 715 is supplied. In one implementation, the feedback voltage signal 715 configures the setpoint of the voltage converter circuit 710.

In the implementation illustrated in FIG. 7, when the control voltage 714 increases, the voltage converter circuit 710 decreases its output current (the 2S battery current 712)

contribution to the system load 708, and the 1S battery current 716 contribution increases. When the control voltage 714 decreases, the voltage converter circuit 710 increases its output current (the 2S battery current 712) contribution to the system load 708, and the 1S battery current 716 contribution decreases. In one implementation of a discharge mode, the control voltage 714 is input to a voltage divider that is configured to maintain this output voltage to be less than the output voltage of the 1S battery pack 702, thereby actively balancing the 1S battery current 716 contribution and the 2S battery current 712 contribution to the load supply current 720.

In FIG. 7, the control voltage 714 is based on the 1S battery current 716. A 1S battery current sense circuit 722 measures the 1S battery current 716 through a resistor and yields a representative voltage signal that is input to a discharge feedback controller 726.

The discharge feedback controller 726 in the illustrated implementation is coupled to a tracking circuit 724 (e.g., in the form of a FET), although other tracking circuits may be employed. A 1S battery current sense circuit 722 measures the 1S battery current 716 and yields a representative voltage signal that is input to a discharge feedback controller 726, which is coupled to the tracking circuit 724 that maintains a relationship between the 1S battery current 716 and 2S battery current 712 contributions supplied to the system load 708. In one implementation, the voltage converter circuit 710 and the FET of the tracking circuit 724 maintain the output voltage of the voltage converter circuit 710 at or below the output voltage of the 1S battery pack 702.

When the voltage at the summing node 718 does not satisfy a load sharing condition (e.g., a load sharing condition is set to allocate 80% or less of the load supply current 720), the control voltage 714 adjusts the output voltage of the voltage converter circuit 710, thereby adjusting the 2S battery current 712 contribution to the load supply current 720 and satisfying the load sharing condition based (at least in part) on the representative voltage signal for the 1S battery current 716.

Furthermore, the representative voltage signal (e.g., an error signal) for the 1S battery current 716 is also supplied to the discharge feedback controller 726 to influence the control voltage 714 to the voltage converter circuit 710, thereby influencing the 2S battery current 712 supplied by the 2S battery pack 704 through the voltage converter circuit 710. In one implementation, the voltage converter circuit 710 employs a PSM mode (pulse skip, or light load mode), such that it does not discharge through its low-side FET if its output voltage is slightly biased above its control voltage.

In one implementation, the voltage converter circuit 710 is actively configured to satisfy a load sharing condition. An example load sharing condition may include a determination that the discharge voltage level of the voltage converter circuit 710 tracks at or slightly below the discharge voltage level of the 1S battery pack 702. Another example load sharing condition may include a determination that the discharge current of the 1S battery pack 702 does not exceed a preset discharge current limit. Other load sharing conditions may be applied.

When the 1S battery pack 702 fails to satisfy a load sharing condition, the tracking circuit 724 adjusts a tracking signal supplied to the discharge feedback controller 726. An output voltage of the discharge feedback controller 726 provides a control voltage 714 through a resistor network (not shown) as an error signal to the voltage converter circuit 710 to balance additional current provided by the 2S battery pack 704 through the voltage converter circuit 710. Accordingly, the output voltage of the voltage converter circuit 710 is matched to allow the 1S battery pack 702 to discharge in satisfaction of a load sharing condition while additional current supplied to the system load 708 is contributed by the 2S battery pack 704 through the voltage converter circuit 710. This implementation presents an example of actively balancing current provided to the system load 708 by the 1S battery pack 702 and the 2S battery pack 704 (through the voltage converter circuit 710).

The discharge feedback controller 726, therefore, determines whether and by how much the 1S battery current 716 satisfies a load sharing condition and supplies the control voltage 714 to adjust the output voltage of the voltage converter circuit 710, thereby adjusting the relative 1S battery current 716 and 2S battery current 712 contributions to re-establish the load sharing condition. The operation of the feedback controller 726 may be performed via circuitry or a combination of circuitry and power control software.

Furthermore, the FET in the tracking circuit 724 may also operate in the linear region to present a variable resistance on the output of the 1S battery pack 702 when constraining discharge current from the 1S battery pack 702 within its discharge current limits. In one implementation, the tracking circuit 724 acts as a constant current limiter in the discharge path of the 1S battery pack 702 by dynamically increasing impedance as the discharge current limit of the 1S battery pack 702 is reached. If the discharge current approaches or exceeds the discharge current limit of the 1S battery pack 702, the representative voltage signal for the 1S battery current 716 begins to turn off the FET and increase the impedance across the FET in the linear region, thereby reducing the 1S battery current 716 supplied to the system load 708. Accordingly, the FET, which can operate in a linear region, presents a variable resistance between the first battery power source and the system load to limit the discharge current supplied by the 1S battery pack 702.

In summary, the parallel battery discharge management circuitry 700 uses the tracking circuit 724 and the discharge feedback controller 726 to configure the output voltage of the voltage converter circuit 710 to track at or below the output voltage of the 1S battery pack voltage so that the 1S battery pack 702 is able to discharge, as desired. Closed loop feedback from a 1S battery current sense circuit 722 in combination with the tracking circuit 730 in the 1S battery pack discharge path is used to dynamically adjust the output of the voltage converter circuit 710 to track its output voltage below the 1S battery pack voltage, such that an acceptable headroom (e.g., a minimum headroom) is maintained. In addition, a FET in the tracking circuit 730 can provide a variable resistance to the output of the 1S battery pack 702 to constrain the 1S battery current 716 within the discharge current limits of the 1S battery pack 702.

Figure 8:
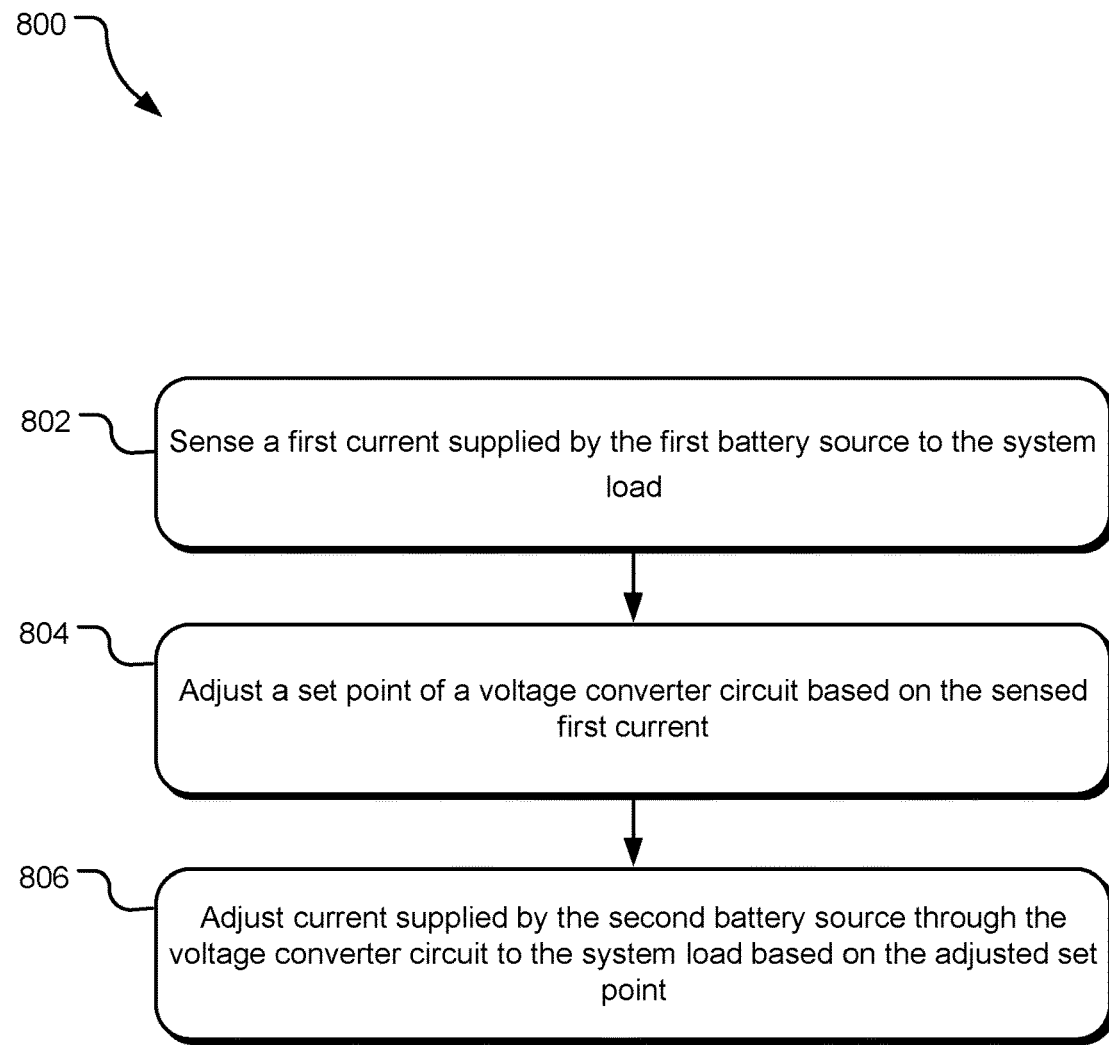
FIG. 8 illustrates example operations for providing parallel battery discharge management.

FIG. 8 illustrates example operations 800 for providing parallel battery discharge management. The operations 800 balance power supplied to a system load by a first battery power source and a second battery power source. A sensing operation 802 senses a first current supplied by the first battery power source to the system load. In one implementation, the first current is sensed across a resistor by an operational amplifier circuit that generates a voltage signal representing the first current, although other current sensing techniques may be employed.

An adjusting operation 804 adjusts a control voltage electrically coupled to a voltage converter circuit, the adjusting being based on the sensed first current. In one implementation, a discharge feedback controller receives the sensed first current and outputs a responsive control voltage. Based on the control voltage, which is dependent on the sensed first current, the voltage converter circuit adjusts its output voltage. The input of the voltage converter circuit is electrically coupled to the second battery power source, and the output of the voltage converter circuit is electrically coupled to the system load. In one implementation, the control voltage is adjusted based on the sensed first current and a sensed current supplied to the system load. In another implementation, the control voltage is adjusted based on the sensed first current and the voltage level at the system load.

Another adjusting operation 806 adjusts the current supplied by the second battery source through the voltage converter circuit based on the adjusted control voltage. The output voltage of the voltage converter circuit is adjusted based on the control voltage, which is dependent on the sensed first current. By adjusting the control voltage and therefore the output voltage of the voltage converter circuit, the adjusting operation 806 actively balances the discharge current supplied to the system load between the discharge current of the first battery power source and the second battery power source through the voltage converter circuit.

Figure 9:
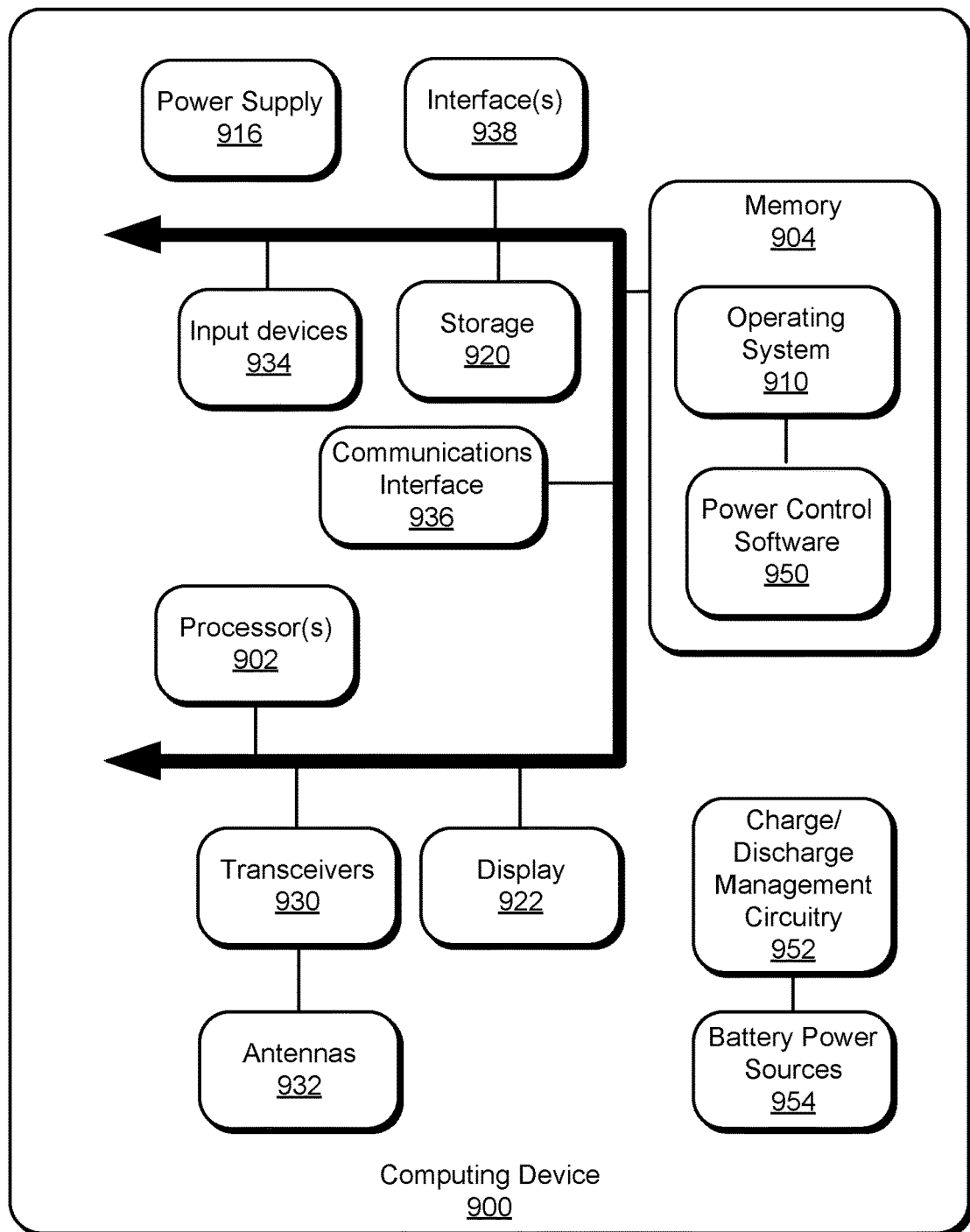
FIG. 9 illustrates an example computing device for use in providing parallel battery discharge management.

FIG. 9 illustrates an example computing device for use in providing parallel battery discharge management. The computing device 900 is an example electronic device and may be a client device, such as a laptop, mobile device, desktop, tablet, or a server/cloud device. The computing device 900 includes one or more processor(s) 902, and a memory 904. The memory 904 generally includes both volatile memory (e.g., RAM) and non-volatile memory (e.g., flash memory). An operating system 910 resides in the memory 904 and is executed by the processor(s) 902.

In an example computing device 900, as shown in FIG. 9, one or more modules or segments, such as power control software 950, application modules, and other modules, are loaded into the operating system 910 on the memory 904 and/or storage 920 and executed by processor(s) 902. The storage 920 may be stored battery characteristics, charge levels, system load requirements, and other data and be local to the computing device 900 or may be remote and communicatively connected to the computing device 900.

The computing device 900 includes a power supply 916, which is powered by one or more batteries or other power sources and which provides power to other components of the computing device 900. The power supply 916 may also be connected to an external power source that overrides or recharges the built-in batteries or other power sources. In one implementation, charge/discharge management circuitry 952 is electrically coupled to multiple battery power sources 954 to balance the current provided by the multiple battery power sources 954 to one or more system loads in the computing device 900

The computing device 900 may include one or more communication transceivers 930 which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The computing device 900 may further include a network adapter 936, which is a type of communication device. The computing device 900 may use the adapter and any other types of communication devices for establishing connections over a wide-area network (WAN) or local-area network (LAN). It should be appreciated that the network connections shown are exemplary and that other communications devices and means for establishing a communications link between the computing device 900 and other devices may be used.

The computing device 900 may include one or more input devices 934 such that a user may enter commands and information (e.g., a keyboard or mouse). These and other input devices may be coupled to the server by one or more interfaces 938 such as a serial port interface, parallel port, or universal serial bus (USB). The computing device 900 may further include a display 922, such as a touch screen display.

The computing device 900 may include a variety of tangible processor-readable storage media and intangible processor-readable communication signals. Tangible processor-readable storage can be embodied by any available media that can be accessed by the computing device 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Figure 10:
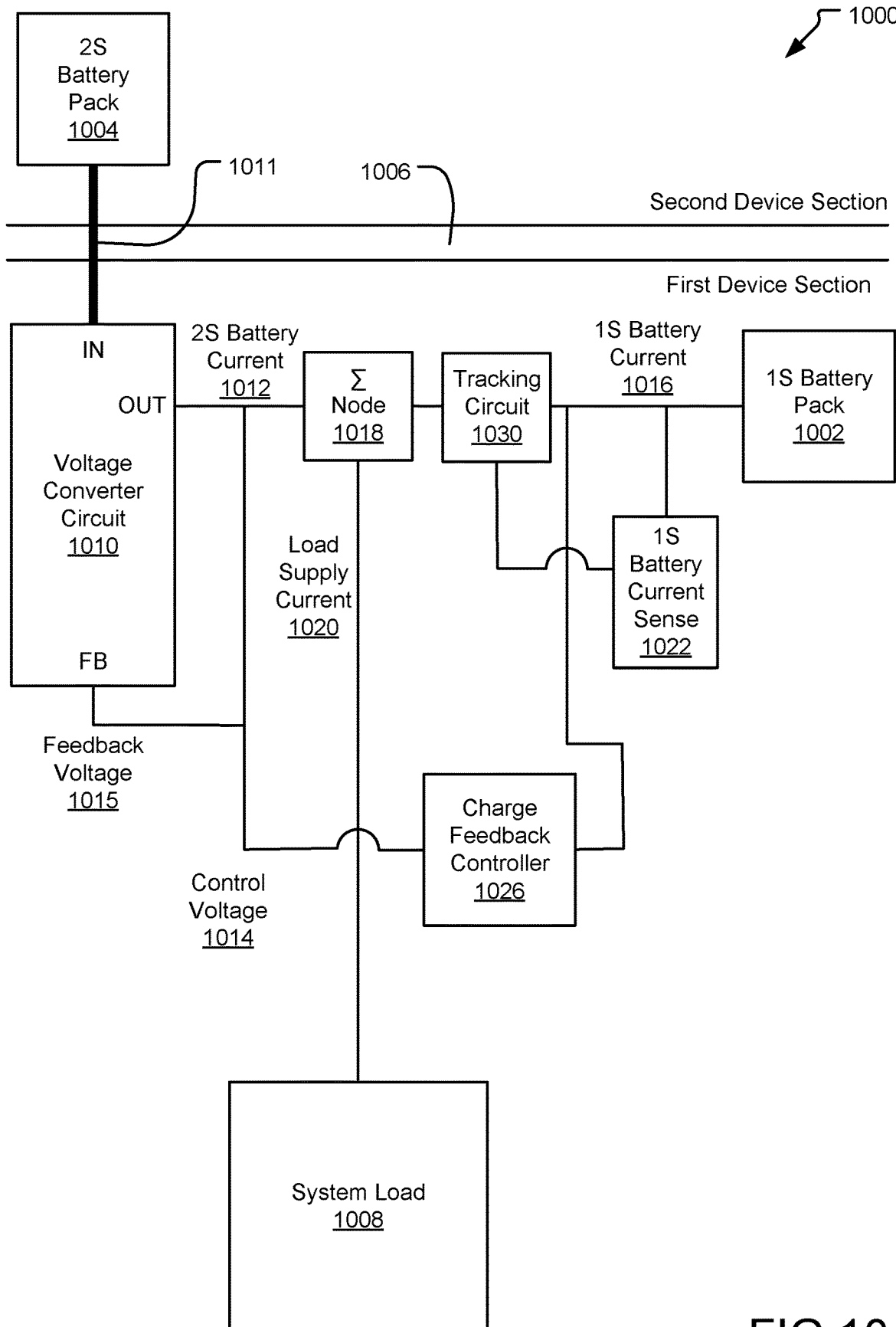
FIG. 10 illustrates example parallel battery charge management circuitry.

FIG. 10 illustrates example parallel battery charge management circuitry 1000. A 1S battery pack 1002 is located in a first device section of a multi-section computing device, and a 2S battery pack 1004 is located in a second device section of the multi-section computing device. The parallel battery charge management circuitry 1000 represents an example circuit for balancing the current provided by the 2S battery pack 1004 through a voltage converter circuit 1010 to charge the 1S battery pack 1002 and/or to drive the system load 1008.

The two device sections are divided by a device section boundary 1006, which may include a foldable and/or detachable interconnection or hinge. The first device section includes the system load 1008, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying charge management circuitry are configured to balance current supplied by the 2S battery pack 1004 to the 1S battery pack 1002 and/or the system load 1008. The parallel battery charge management circuitry 1000 shown in FIG. 10 includes a voltage converter circuit 1010 (e.g., a buck converter) with an input port that is electrically coupled to the 2S battery pack 1004 via an electrical connector 1011. In one implementation, the electrical connector 1011 includes a high impedance connector that bridges the device section boundary 1006 and presents a voltage drop between the 2S battery pack 1004 and the voltage converter circuit 1010 equal to or greater than 5% of the concurrent voltage supplied to the system load 1008. In another implementation, the electrical connector 1011 includes a high impedance connector that bridges the device section boundary 1006 and presents an interconnect impedance that is equal to or greater than 20% of the impedance of the 2S battery pack 1004. In other implementations, the electrical connector 1011 need not include a high impedance connector.

The voltage converter circuit 1010 also includes an output port from which the 2S battery current 1012 supplied by the 2S battery pack 1004 is provided to a summing node 1018 in a discharge mode. In a charge mode, the output port of the voltage converter circuit 1010 supplies a charge current to the summing node 1018. In this charge mode, the charge feedback controller 1026, a tracking circuit 1030, and the voltage converter circuit 1010 balance the charge current supplied from the 2S battery pack 1004 through the voltage converter circuit 1010 to the 1S battery pack 1002 and/or the system load 1008. It should be understood that the charge current contribution received by the system load 1008 (e.g., the load supply current 1020) or the 1S battery pack 1002 (the 1S battery current 1016) can be zero amps in some operating conditions.

The voltage converter circuit 1010 also includes a feedback voltage input port to which a feedback voltage signal 1015 is supplied. In one implementation, the feedback voltage signal 1015 configures the setpoint of the voltage converter circuit 1010.

In the implementation illustrated in FIG. 10, when the control voltage 1014 increases, the voltage converter circuit 1010 decreases the charge current supplied from the 2S battery pack 1004. When the control voltage 1014 decreases, the voltage converter circuit 1010 increases the charge current supplied from the 2S battery pack 1004. In a charge mode, the control voltage 1014 is input to a voltage divider that is configured to maintain the voltage at the output port of the voltage converter circuit 1010 at or above the output voltage of the 1S battery pack 1002.

In FIG. 10, the control voltage 1014 is based on the 1S battery current 1016. A 1S battery current sense circuit 1022 measures the 1S battery current 1016 and yields a representative voltage signal that is input to a charge feedback controller 1026. which is coupled to the voltage converter circuit 610 and the tracking circuit 1030 that maintain a relationship between the output voltages of the 1S battery pack 1002 and the voltage converter circuit 1010, that the output voltage of the voltage converter circuit 1010 is at or above the output voltage of the 1S battery pack 1002 so as to provide a charge current to the 1S battery pack 1002 from the voltage converter circuit 1010.

Accordingly, in one implementation, the voltage converter circuit 1010 is actively configured to maintain the output voltage of the voltage converter circuit 1010 to exceed the output voltage of the 1S battery pack 1002. In one implementation, the charge feedback controller 1026 outputs the control voltage 1014 to adjust the output voltage of the voltage converter circuit 1010. In one implementation, the control voltage 1014 adjusts the output voltage of the voltage converter circuit 1010 to exceed the output voltage of the 1S battery pack 1002 by a specific amount to result in a charge current being sent to the 1S battery pack 1002. For example, as the 1S battery pack 1002 charges, its output voltage increases, and so, if the output voltage of the voltage converter circuit 1010 is set to exceed the output voltage of the 1S battery pack 1002 by 200 mV, the voltage converter circuit 1010 adjusts its output voltage to track substantially at 200 mV above the increasing output voltage of the 1S battery pack 1002. Accordingly, in one implementation, the voltage converter circuit 1010 is actively configured to track slightly above the charge voltage level of the 1S battery pack 1002.

The output of the charge feedback controller 1026, therefore, determines whether and by how much of the charge current is supplied to the 1S battery pack 1002 by the 2S battery pack 1004 through the voltage converter circuit 1010. The operation of the charge feedback controller 1026 may be performed via circuitry or a combination of circuitry and power control software.

Furthermore, when the 1S battery pack 1002 reaches its preset charge current limit, the representative voltage signal from the 1S battery current sense circuit 1022 begins to operate the tracking circuit 1030 in a variable resistance mode to limit the charge current provided to the 1S battery pack 1002. The tracking circuit 1030 is used for fine tuning/limiting of this charge current supplied to the 1S battery pack 1002. The tracking circuit 1030 will increase its resistance as necessary to limit the charge current supplied to the 1S battery pack 1002, if the charge current starts to exceed a target charge current limit setting. When this occurs, the same error signal supplied to the tracking circuit 1030 will adjust the control voltage 1014 output by the charge feedback controller 1026. For example, in a tracking circuit that includes a FET, the same signal that turns on this FET is also input to the charge feedback controller 1026, which adjusts the voltage converter circuit output down accordingly until the FET no longer limits the current. This configuration presents a closed loop system and, as such, will reach equilibrium in steady state where the current/voltage is set to achieve the charge current desired into the 1S battery pack 1002 with minimum loss required in the tracking circuit 1030. Accordingly, the tracking circuit 1030 also constrains 1S battery pack 1002 to charge within its preset charge current limit (e.g., at a preset charge current rate).

Accordingly, power from the 2S battery pack 1004 is supplied through the voltage converter circuit 1010 to the 1S battery pack 1002 and/or the system load 1008 to satisfy the charge current limit of the 1S battery pack 1002 and/or to satisfy system load requirements. Generally, the voltage converter circuit 1010 will supply all of the current to the system load 1008 and up to the charge current limit setting of the 1S battery pack 1002. If the voltage converter circuit 1010 current (supplied by the 2S battery pack 1004) cannot supply sufficient current to the 1S battery pack 1002 and the system load 1008 (e.g., the 2S battery pack runs out of charge, hits its current limits, hits its thermal limits, etc.) then the charge current supply to the 1S battery pack 1002 will begin to reduce.

If this insufficient increase continues or the current requirements of the system load 1008 increases, the amount of current to the 1S battery pack 1002 will reduce until, at some point, the output voltage of the voltage converter circuit 1010 is the same and/or lower than that of the 1S battery pack 1002. At this point, the 1S battery pack 1002 will start to discharge to support the current requirements of the system load 1008. There can be software to monitor for this scenario and to limit system load, to reduce the 1S charge rate dynamically (adjust the current setting), or to provide other responses. Without such intervention, the response of the system will be that the output voltage of the voltage converter circuit 1010 decreases, the charging of the 1S battery pack 1002 stops, and if necessary, the 1S battery pack 1002 temporarily discharges current to the system load as well (combined with the discharge from 2S battery pack 1004 through the voltage converter circuit 1010). When the system load 1008 reduces enough, the charging of the 1S battery pack 1002 from the 2S battery pack 1004 through the voltage converter circuit 1010 will resume.

Figure 11:
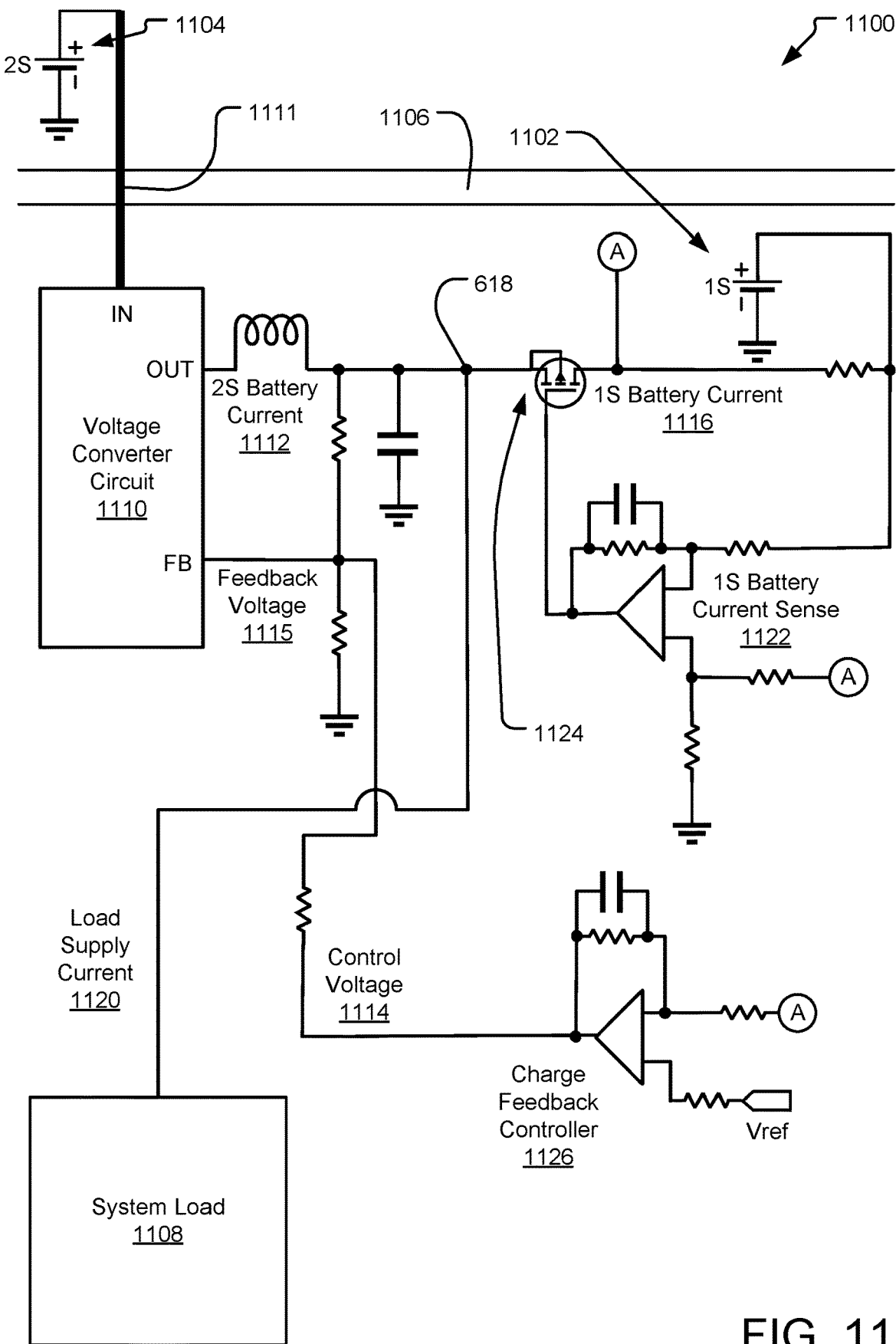
FIG. 11 illustrates a schematic of example parallel battery charge management circuitry.

FIG. 11 illustrates a schematic of an example parallel battery charge management circuitry. A 1S battery pack 1102 is located in a first device section of a multi-section computing device and supplies a variable 1S battery current 1116. In a discharge mode, a 2S battery pack 1104 is located in a second device section of the multi-section computing device and supplies a variable 2S battery current 1112, and the 1S battery current 1116 and 2S battery current 1112 can both contribute to a load supply current 1120 supplied to a system load 1108. In a charge mode, the 2S battery current is supplied to charge the 1S battery pack 1102 through a voltage converter circuit 1110. The parallel battery charge management circuitry 1100 represents an example circuit for charging the 1S battery pack 1102 from the 2S battery pack 1104 through the voltage converter circuit 1110.

The two device sections are divided by a device section boundary 1106, which may include a foldable and/or detachable interconnection or hinge. The first device section includes the system load 1108, which may include a variety of components including without limitation display components, a system-on-a-chip (SOC), one or more microprocessors, one or more communication interfaces, a keyboard, a trackpad, a camera, a microphone, and a speaker. The second device section may also include a system load (not shown) that includes without limitation similar or very different components.

The battery packs and the accompanying charge management circuitry are configured to balance charge current supplied by the 2S battery pack 1104 to the 1S battery pack 1102 and/or the system load 1108. The charge management circuitry shown in FIG. 11 includes the voltage converter circuit 1110 (e.g., a buck converter) with an input port that is electrically coupled to the 2S battery pack 1104 via an electrical connector 1111. In one implementation, the electrical connector 1111 includes a high impedance connector that bridges the device section boundary 1106 and presents a voltage drop between the 2S battery pack 1104 and the voltage converter circuit 1110 equal to or greater than 5% of the concurrent voltage supplied to the system load 1108. In another implementation, the electrical connector 1111 includes a high impedance connector that bridges the device section boundary 1106 and presents an interconnect impedance that is equal to or greater than 20% of the impedance of the 2S battery pack 1104. In other implementations, the electrical connector 1111 need not include a high impedance connector.

The voltage converter circuit 1110 also includes an output port from which the 2S battery current 1112 supplied by the 2S battery pack 1104 is provided to a summing node 1118 in a discharge mode. In a charge mode, the output port of the voltage converter circuit 1110 supplies a charge current to the summing node 1118. In this charge mode, the charge feedback controller 1126, a tracking circuit 1124 (which, in one implementation, includes a FET), and the voltage converter circuit 1110 balance the charge current supplied from the 2S battery pack 1104 through the voltage converter circuit 1110 to the 1S battery pack 1102. It should be understood that the charge current contribution received by the system load 1108 (e.g., the load supply current 1120) or the 1S battery pack 1102 (the 1S battery current 1116) can be zero amps in some operating conditions.

The voltage converter circuit 1110 also includes a feedback voltage input port to which a feedback voltage signal 1115 is supplied. In one implementation, the feedback voltage signal 1115 configures the setpoint of the voltage converter circuit 1110.

In the implementation illustrated in FIG. 11, when the control voltage 1114 increases, the voltage converter circuit 1110 decreases the charge current supplied from the 2S battery pack 1104. When the control voltage 1114 decreases, the voltage converter circuit 1110 increases the charge current supplied from the 2S battery pack 1104. In a charge mode, the control voltage 1114 is input to a voltage divider that is configured to maintain the voltage at the output port of the voltage converter circuit 1110 at or above the output voltage of the 1S battery pack 1102.

In FIG. 11, the control voltage 1114 is based on the 1S battery current 1116. A 1S battery current sense circuit 1122 measures the 1S battery current 1116 and yields a representative voltage signal that is input to a charge feedback controller 1126. which is coupled to the voltage converter circuit 610 and the tracking circuit 1124 that maintain a relationship between the output voltages of the 1S battery pack 1102 and the voltage converter circuit 1110, that the output voltage of the voltage converter circuit 1110 is at or above the output voltage of the 1S battery pack 1102 so as to provide a charge current to the 1S battery pack 1102 from the voltage converter circuit 1110.

Accordingly, one implementation, the voltage converter circuit 1110 is actively configured to maintain the output voltage of the voltage converter circuit 1110 to exceed the output voltage of the 1S battery pack 1102. In one implementation, the charge feedback controller 1126 outputs the control voltage 1114 to adjust the output voltage of the voltage converter circuit 1110. In one implementation, the control voltage 1114 adjusts the output voltage of the voltage converter circuit 1110 to exceed the output voltage of the 1S battery pack 1102 by a specific amount to result in a charge current being sent to the 1S battery pack 1102. For example, as the 1S battery pack 1102 charges, its output voltage increases, and so, if the output voltage of the voltage converter circuit 1110 is set to exceed the output voltage of the 1S battery pack 1102 by 200 mV, the voltage converter circuit adjusts its output voltage to track substantially at 200 mV above the increasing output voltage of the 1S battery pack 1102. Accordingly, in one implementation, the voltage converter circuit 1110 is actively configured to track slightly above the charge voltage level of the 1S battery pack 1102.

The output of the charge feedback controller 1126, therefore, determines whether and by how much of the charge current is supplied to the 1S battery pack 1102 by the 2S battery pack 1104 through the voltage converter circuit 1110. The operation of the charge feedback controller 1126 may be performed via circuitry or a combination of circuitry and power control software.

Furthermore, when the 1S battery pack 1102 reaches its preset charge current limit, the representative voltage signal from the 1S battery current sense circuit 1122 begins to operate the tracking circuit 1124 in a variable resistance mode to limit the charge current provided to the 1S battery pack 1102. The tracking circuit 1124 is used for fine tuning/limiting of this charge current supplied to the 1S battery pack 1102. The tracking circuit 1124 will increase its resistance as necessary to limit the charge current supplied to the 1S battery pack 1102, if the charge current starts to exceed a target charge current limit setting. When this occurs, the same error signal supplied to the tracking circuit 1124 will adjust the control voltage 1114 output by the charge feedback controller 1126. For example, in a tracking circuit that includes a FET, the same signal that turns on this FET is also input to the charge feedback controller 1126, which adjusts the voltage converter circuit output down accordingly until the FET no longer limits the current. This configuration presents a closed loop system and, as such, will reach equilibrium in steady state where the current/voltage is set to achieve the charge current desired into the 1S battery pack 1102 with minimum loss required in the tracking circuit 1124. Accordingly, the tracking circuit 1124 also constrains 1S battery pack 1102 to charge within its preset charge current limit (e.g., at a preset charge current rate).

Accordingly, power from the 2S battery pack 1104 is supplied through the voltage converter circuit 1110 to the 1S battery pack 1102 and/or the system load 1108 to satisfy the charge current limit of the 1S battery pack 1102 and/or to satisfy system load requirements. Generally, the voltage converter circuit 1110 will supply all of the current to the system load 1108 and up to the charge current limit setting of the 1S battery pack 1102. If the voltage converter circuit 1110 current (supplied by the 2S battery pack 1104) cannot supply sufficient current to the 1S battery pack 1102 and the system load 1108 (e.g., the 2S battery pack runs out of charge, hits its current limits, hits its thermal limits, etc.) then the charge current supply to the 1S battery pack 1102 will begin to reduce.

If this insufficient increase continues or the current requirements of the system load 1108 increases, the amount of current to the 1S battery pack 1102 will reduce until, at some point, the output voltage of the voltage converter circuit 1110 is the same and/or lower than that of the 1S battery pack 1102. At this point, the 1S battery pack 1102 will start to discharge to support the current requirements of the system load 1108. There can be software to monitor for this scenario and to limit system load, to reduce the 1S charge rate dynamically (adjust the current setting), or to provide other responses. Without such intervention, the response of the system will be that the output voltage of the voltage converter circuit 1110 decreases, the charging of the 1S battery pack 1102 stops, and if necessary, the 1S battery pack 1102 temporarily discharges current to the system load as well (combined with the discharge from 2S battery pack 1104 through the voltage converter circuit 1110). When the system load 1108 reduces enough, the charging of the 1S battery pack 1102 2S battery pack 1104 through the voltage converter circuit 1110 will resume.

Figure 12:
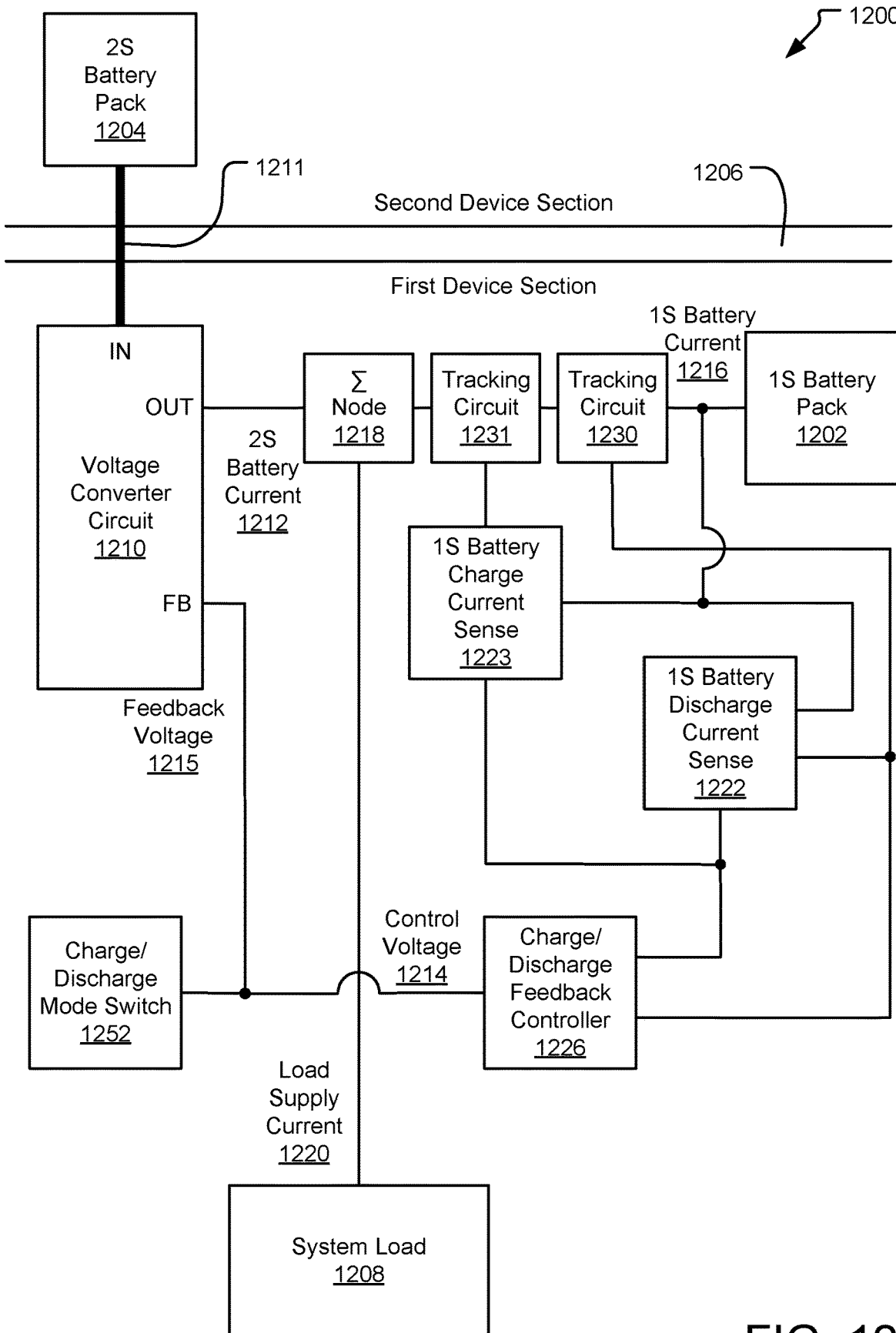
FIG. 12 illustrates example parallel battery charge/discharge management circuitry.

FIG. 12 illustrates example parallel battery charge/discharge management circuitry 1200. The parallel battery charge/discharge management circuitry 1200 selectively manages discharging of a 1S battery pack 1202 and a 2S battery pack 1204 via an electrical connector 1211 over a device section boundary 1206 and/or charging of the 1S battery pack 1202 by the 2S battery pack 1204 through a voltage converter circuit 1210. Charging and discharging modes are selectable via a charge/discharge mode switch 1252. The parallel battery charge/discharge management circuitry 1200 includes similar components as those shown in FIGS. 6 and/or 10 herein, but in combination, including without limitation a voltage converter circuit 1210, a 1S battery discharge current sense circuit 1222, a 1S battery charge current sense circuit 1223, two tracking circuits 1230 and 1231, a summing node 1218, and a charge/discharge feedback controller 1226. In one implementation, a feedback voltage signal 1215 configures the setpoint of the voltage converter circuit 1210.

In a discharge mode, as selected by the charge/discharge mode switch 1252, the parallel battery charge/discharge management circuitry 1200 balances load sharing of load current provided to a system load 1208 by the 1S battery pack 1202 and the 2S battery pack 1204 by operation of the 1S battery discharge current sense circuit 1222, the tracking circuit 1230, the charge/discharge feedback controller 1226, and the voltage converter circuit 1210 (according to the control voltage 1214). In a charge mode, as selected by the charge/discharge mode switch 1252, the parallel battery charge/discharge management circuitry 1200 balances the charge current provided to the 1S battery pack 1202 and the system load 1208 from the 2S battery pack 1204 through the voltage converter circuit 1210 by operation of the 1S battery charge current sense circuit 1223, the tracking circuit 1231, the charge/discharge feedback controller 1226, and the voltage converter circuit 1210 (according to the control voltage 1214). Alternative implementations may be employed.

Figure 13:
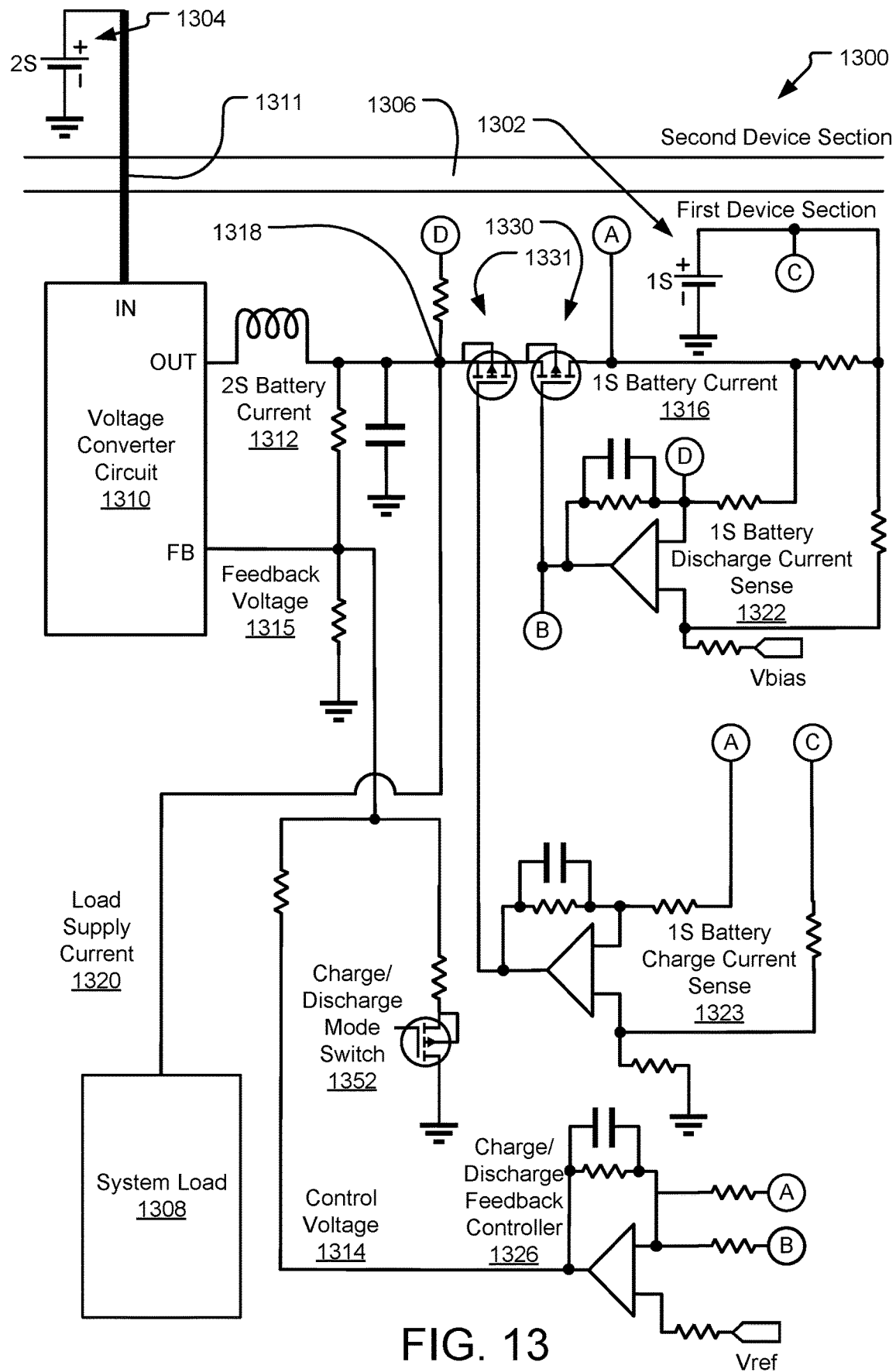
FIG. 13 illustrates a schematic of example parallel battery charge/discharge management circuitry.

FIG. 13 illustrates a schematic of example parallel battery charge/discharge management circuitry 1300. The parallel battery charge/discharge management circuitry 1300 selectively manages discharging of a 1S battery pack 1302 and a 2S battery pack 1304 via an electrical connector 1311 over a device section boundary 1306 and/or charging of the 1S battery pack 1302 by the 2S battery pack 1304 through a voltage converter circuit 1310. Charging and discharging modes are selectable via a charge/discharge mode switch 1352. The parallel battery charge/discharge management circuitry 1300 includes similar components as those shown in FIGS. 7 and/or 11 herein, but in combination, including without limitation a voltage converter circuit 1310, a 1S battery discharge current sense circuit 1322, a 1S battery charge current sense circuit 1323, two tracking circuits 1330 and 1331, a summing node 1318, and a charge/discharge feedback controller 1326. In one implementation, a feedback voltage signal 1315 configures the setpoint of the voltage converter circuit 1310.

In a discharge mode, as selected by the charge/discharge mode switch 1352, the parallel battery charge/discharge management circuitry 1300 balances load sharing of load current provided to a system load 1308 by the 1S battery pack 1302 and the 2S battery pack 1304 by operation of the 1S battery discharge current sense circuit 1322, the tracking circuit 1330, the charge/discharge feedback controller 1326, and the voltage converter circuit 1310 (according to the control voltage 1314). In a charge mode, as selected by the charge/discharge mode switch 1352, the parallel battery charge/discharge management circuitry 1300 balances the charge current provided to the 1S battery pack 1302 and the system load 1308 from the 2S battery pack 1304 through the voltage converter circuit 1310 by operation of the 1S battery charge current sense circuit 1323, the tracking circuit 1331, the charge/discharge feedback controller 1326, and the voltage converter circuit 1310 (according to the control voltage 1314). Alternative implementations may be employed.

Figure 14:
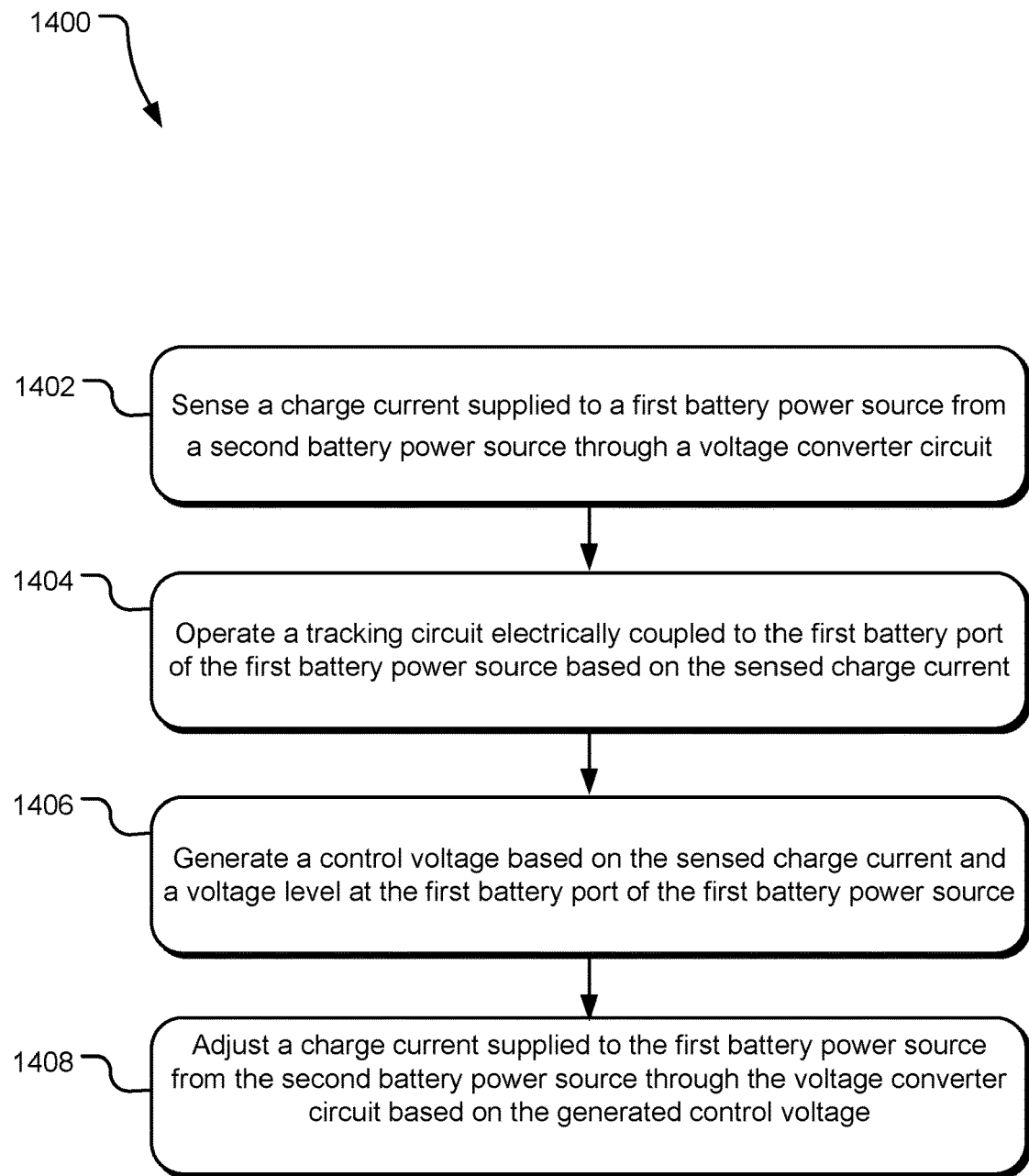
FIG. 14 illustrates example operations for providing parallel battery charge management.

FIG. 14 illustrates example operations 1400 for providing parallel battery charge management. A sensing operation 1402 senses a charge current supplied to a first battery power source from a second battery power source through a voltage converter circuit. A tracking operation 1404 operates a tracking circuit electrically coupled to the first battery port of the first battery power source based on the sensed charge current. A generating operation 1406 generates a control voltage based on the sensed charge current and a voltage level at the first battery port of the first battery power source. An adjusting operation 1408 adjusts a charge current supplied to the first battery power source from the second battery power source through the voltage converter circuit based on the generated control voltage.

The tracking circuit can present a variable resistance at the first battery port of the first battery power source to constrain the charge current supplied to the first battery power source within a preset charge current limit. In one implementation, the tracking circuit includes a FET operating in a linear region when presenting the variable resistance between the first battery power source and the output port of the voltage converter circuit.

The control voltage is configured to adjust the voltage converter circuit to output an output voltage at the output port that equals or exceeds a voltage level at the first battery port of the first battery power source.

An example electronic device adjusts power supplied to a first battery power source by a second battery power source. The first battery power source includes. a first battery port. The example electronic device includes a battery current sense circuit electrically coupled to sense a charge current supplied to the first battery power source and a tracking circuit electrically coupled to the first battery port of the first battery power source, operation of the tracking circuit being dependent on the sensed charge current. A charge feedback controller is electrically coupled to the battery current sense circuit and the tracking circuit and configured to generate a control voltage based on an output voltage at the first battery port of the first battery power source. A voltage converter circuit includes an input port electrically coupled to the second battery power source and an output port electrically coupled to the tracking circuit and the first battery power source. The voltage converter circuit is configured to adjust the charge current supplied by the second battery power source through the voltage converter circuit to the first power source based on the control voltage.

Another example electronic device of any preceding electronic device is provided, wherein the tracking circuit presents a variable resistance at the first battery port of the first battery power source to constrain the charge current supplied to the first battery power source within a preset charge current limit.

Another example electronic device of any preceding electronic device is provided, wherein the tracking circuit includes a FET operating in a linear region when presenting a variable resistance between the first battery power source and the output port of the voltage converter circuit.

Another example electronic device of any preceding electronic device is provided, wherein the control voltage is configured to adjust the voltage converter circuit to output an output voltage at the output port that equals or exceeds a voltage level at the first battery port of the first battery power source.

Another example electronic device of any preceding electronic device is provided, wherein the control voltage from the charge feedback controller varies with an output voltage level of the first battery port.

Another example electronic device of any preceding electronic device further includes a first device section containing the first battery power source, and a second device section containing the second battery power source, wherein the first device section and the second device section are separated by a device section boundary. An electrical connection traverses the device section boundary and connects the second battery power source to the input port of the voltage converter circuit.

Another example electronic device of any preceding electronic device further includes another battery current sense circuit electrically coupled to sense a discharge current supplied by the first battery power source to system load a discharge feedback controller electrically coupled to the other battery current sense circuit and configured to generate another control voltage based on the sensed discharge current, wherein the voltage converter circuit is further configured to adjust a discharge current supplied by the second battery power source through the voltage converter circuit to the system load based on the control voltage.

Another example electronic device of any preceding electronic device further includes a charge/discharge mode switch electrically coupled to the voltage converter circuit and configured to switch the voltage converter circuit between charging the first battery power source from the second battery power source and discharging the first battery power source to the system load.

An example method balances power supplied to a first battery power source by a second battery power source. The first battery power source includes a first battery port. A charge current supplied to a first battery power source from a second battery power source through a voltage converter circuit is sensed. A tracking circuit is electrically coupled to the first battery port of the first battery power source and is operated based on the sensed charge current. A control voltage is generated based on a voltage level at the first battery port of the first battery power source. A charge current is supplied to the first battery power source from the second battery power source through the voltage converter circuit based on the generated control voltage.

Another example method of any preceding method is provided, wherein the tracking circuit presents a variable resistance at the first battery port of the first battery power source to constrain the charge current supplied to the first battery power source within a preset charge current limit.

Another example method of any preceding method is provided, wherein the tracking circuit includes a FET operating in a linear region when presenting a variable resistance between the first battery power source and an output port of the voltage converter circuit.

Another example method of any preceding method is provided, wherein the control voltage is configured to adjust the voltage converter circuit to output an output voltage that equals or exceeds a voltage level at the first battery port of the first battery power source.

Another example method of any preceding method further includes switching the voltage converter circuit between charging the first battery power source from the second battery power source and discharging the first battery power source to a system load.

Example battery charge management circuitry adjusts power supplied to a first battery power source by a second battery power source, the first battery power source including a first battery port. The example battery charge management circuity includes a battery current sense circuit electrically coupled to sense a charge current supplied to the first battery power source, and a tracking circuit electrically coupled to the first battery port of the first battery power source, wherein operation of the tracking circuit is dependent on the sensed charge current, and a charge feedback controller electrically coupled to the battery current sense circuit and the tracking circuit and configured to generate a control voltage based on an output voltage at the first battery port of the first battery power source. The example battery charge management circuity also includes a voltage converter circuit having an input port electrically coupled to the second battery power source and an output port electrically coupled to the tracking circuit and the first battery power source. The voltage converter circuit is configured to adjust the charge current supplied by the second battery power source through the voltage converter circuit to the first power source based on the control voltage.

Another example battery charge management circuity of any previous circuitry is provided, wherein the tracking circuit presents a variable resistance at the first battery port of the first battery power source to constrain the charge current supplied to the first battery power source within a preset charge current limit.

Another example battery charge management circuity of any previous circuitry is provided, wherein the tracking circuit includes a FET operating in a linear region when presenting a variable resistance between the first battery power source and the output port of the voltage converter circuit.

Another example battery charge management circuity of any previous circuitry is provided wherein the control voltage is configured to adjust the voltage converter circuit to output an output voltage at the output port that equals or exceeds a voltage level at the first battery port of the first battery power source.

Another example battery charge management circuity of any previous circuitry is provided, wherein the control voltage from the charge feedback controller varies with an output voltage level at the first battery port.

Another example battery charge management circuity of any previous circuitry further includes another battery current sense circuit electrically coupled to sense a discharge current supplied by the first battery power source to system load and a discharge feedback controller electrically coupled to the other battery current sense circuit and configured to generate another control voltage based on the sensed discharge current, wherein the voltage converter circuit is further configured to adjust a discharge current supplied by the second battery power source through the voltage converter circuit to the system load based on the control voltage.

Another example battery charge management circuity of any previous circuitry further includes a charge/discharge mode switch electrically coupled to the voltage converter circuit and configured to switch the voltage converter circuit between charging the first battery power source from the second battery power source and discharging the first battery power source to the system load.

An example system balances power supplied to a first battery power source by a second battery power source. The first battery power source includes a first battery port. The system includes means for sensing a charge current supplied to a first battery power source from a second battery power source through a voltage converter circuit, means for operating a tracking circuit electrically coupled to the first battery port of the first battery power source based on the sensed charge current, means for generating a control voltage based on a voltage level at the first battery port of the first battery power source, and means for adjusting a charge current supplied to the first battery power source from the second battery power source through the voltage converter circuit based on the generated control voltage.

Another example system of any preceding system is provided, wherein the tracking circuit presents a variable resistance at the first battery port of the first battery power source to constrain the charge current supplied to the first battery power source within a preset charge current limit.

Another example system of any preceding system is provided, wherein the tracking circuit includes a FET operating in a linear region when presenting a variable resistance between the first battery power source and an output port of the voltage converter circuit.

Another example system of any preceding system is provided, wherein the control voltage is configured to adjust the voltage converter circuit to output an output voltage that equals or exceeds a voltage level at the first battery port of the first battery power source.

Another example system of any preceding system further includes means for switching the voltage converter circuit between charging the first battery power source from the second battery power source and discharging the first battery power source to a system load.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An electronic device for adjusting power supplied to a first battery power source by a second battery power source, the first battery power source including a first battery port, the electronic device comprising:

a battery current sense circuit electrically coupled to sense a charge current supplied to the first battery power source;

a tracking circuit electrically coupled to the first battery port of the first battery power source, operation of the tracking circuit being dependent on the sensed charge current;

a charge feedback controller electrically coupled to the battery current sense circuit and the tracking circuit and configured to generate a control voltage based on an output voltage at the first battery port of the first battery power source; and a voltage converter circuit having an input port electrically coupled to the second battery power source and an output port electrically coupled to the tracking circuit and the first battery power source, the voltage converter circuit being configured to adjust the charge current supplied by the second battery power source through the voltage converter circuit to the first battery power source based on the control voltage.

2. The electronic device of claim 1, wherein the tracking circuit presents a variable resistance at the first battery port of the first battery power source to constrain the charge current supplied to the first battery power source within a preset charge current limit.

3. The electronic device of claim 2, wherein the tracking circuit includes a FET operating in a linear region when presenting a variable resistance between the first battery power source and the output port of the voltage converter circuit.

4. The electronic device of claim 1, wherein the control voltage is configured to adjust the voltage converter circuit to output an output voltage at the output port that equals or exceeds a voltage level at the first battery port of the first battery power source.

5. The electronic device of claim 1, wherein the control voltage from the charge feedback controller varies with an output voltage level of the first battery port.

6. The electronic device of claim 1 further comprising:
a first device section containing the first battery power source;
a second device section containing the second battery power source, the first device section and the second device section being separated by a device section boundary; and
an electrical connection traversing the device section boundary and connecting the second battery power source to the input port of the voltage converter circuit.

7. The electronic device of claim 1 further comprising:
another battery current sense circuit electrically coupled to sense a discharge current supplied by the first battery power source to system load; and
a discharge feedback controller electrically coupled to the other battery current sense circuit and configured to generate another control voltage based on the sensed discharge current, wherein the voltage converter circuit is further configured to adjust a discharge current supplied by the second battery power source through the voltage converter circuit to the system load based on the control voltage.

8. The electronic device of claim 7 further comprising:
a charge/discharge mode switch electrically coupled to the voltage converter circuit and configured to switch the voltage converter circuit between charging the first battery power source from the second battery power source and discharging the first battery power source to the system load.

9. A method of balancing power supplied to a first battery power source by a second battery power source, the first battery power source including a first battery port, the method comprising:
sensing a charge current supplied to a first battery power source from the second battery power source through a voltage converter circuit;
operating a tracking circuit electrically coupled to the first battery port of the first battery power source based on the sensed charge current;
generating a control voltage based on a voltage level at the first battery port of the first battery power source; and
adjusting the charge current supplied to the first battery power source from the second battery power source through the voltage converter circuit based on the generated control voltage.

10. The method of claim 9, wherein the tracking circuit presents a variable resistance at the first battery port of the first battery power source to constrain the charge current supplied to the first battery power source within a preset charge current limit.

11. The method of claim 10, wherein the tracking circuit includes a FET operating in a linear region when presenting a variable resistance between the first battery power source and an output port of the voltage converter circuit.

12. The method of claim 9, wherein the control voltage is configured to adjust the voltage converter circuit to output an output voltage that equals or exceeds a voltage level at the first battery port of the first battery power source.

13. The method of claim 9 further comprising:
switching the voltage converter circuit between charging the first battery power source from the second battery power source and discharging the first battery power source to a system load.

14. Battery charge management circuitry for adjusting power supplied to a first battery power source by a second battery power source, the first battery power source including a first battery port, the battery charge management circuitry comprising:
a battery current sense circuit electrically coupled to sense a charge current supplied to the first battery power source;
a tracking circuit electrically coupled to the first battery port of the first battery power source, operation of the tracking circuit being dependent on the sensed charge current;
a charge feedback controller electrically coupled to the battery current sense circuit and the tracking circuit and configured to generate a control voltage based on an output voltage at the first battery port of the first battery power source; and
a voltage converter circuit having an input port electrically coupled to the second battery power source and an output port electrically coupled to the tracking circuit and the first battery power source, the voltage converter circuit being configured to adjust the charge current supplied by the second battery power source through the voltage converter circuit to the first battery power source based on the control voltage.

15. The battery charge management circuitry of claim 14, wherein the tracking circuit presents a variable resistance at the first battery port of the first battery power source to constrain the charge current supplied to the first battery power source within a preset charge current limit.

16. The battery charge management circuitry of claim 15, wherein the tracking circuit includes a FET operating in a linear region when presenting a variable resistance between the first battery power source and the output port of the voltage converter circuit.

17. The battery charge management circuity of claim 14, wherein the control voltage is configured to adjust the voltage converter circuit to output an output voltage at the output port that equals or exceeds a voltage level at the first battery port of the first battery power source.

18. The battery charge management circuity of claim 14, wherein the control voltage from the charge feedback controller varies with an output voltage level at the first battery port.

19. The battery charge management circuity of claim 14 further comprising:
   another battery current sense circuit electrically coupled to sense a discharge current supplied by the first battery power source to system load; and
   a discharge feedback controller electrically coupled to the other battery current sense circuit and configured to generate another control voltage based on the sensed discharge current, wherein the voltage converter circuit is further configured to adjust a discharge current supplied by the second battery power source through the voltage converter circuit to the system load based on the control voltage.

20. The battery charge management circuity of claim 19 further comprising:
   a charge/discharge mode switch electrically coupled to the voltage converter circuit and configured to switch the voltage converter circuit between charging the first battery power source from the second battery power source and discharging the first battery power source to the system load.

* * * * *